(12) United States Patent
Shinohara et al.

(10) Patent No.: US 9,023,470 B2
(45) Date of Patent: *May 5, 2015

(54) POLYLACTIC ACID RESIN EXPANDED BEADS AND MOLDED ARTICLE OF POLYLACTIC ACID RESIN EXPANDED BEADS

(75) Inventors: Mitsuru Shinohara, Yokkaichi (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/996,202

(22) PCT Filed: Oct. 21, 2011

(86) PCT No.: PCT/JP2011/074263
§ 371 (c)(1),
(2), (4) Date: Jun. 20, 2013

(87) PCT Pub. No.: WO2012/086305
PCT Pub. Date: Jun. 28, 2012

(65) Prior Publication Data
US 2013/0288056 A1    Oct. 31, 2013

(30) Foreign Application Priority Data
Dec. 21, 2010    (JP) .................. 2010-285159

(51) Int. Cl.
*C08G 63/06*    (2006.01)
*C08J 9/232*    (2006.01)
*C08J 9/18*    (2006.01)

(52) U.S. Cl.
CPC ........... *C08G 63/06* (2013.01); *Y10T 428/2982* (2015.01); *C08J 9/232* (2013.01); *C08J 2367/04* (2013.01); *C08J 9/18* (2013.01); *C08J 2203/04* (2013.01); *C08J 2205/04* (2013.01)

(58) Field of Classification Search
USPC .................................. 428/402, 407; 521/182
IPC .............. C08J 9/18; C08L 101/16; C08G 63/06
See application file for complete search history.

(56) References Cited

U.S. PATENT DOCUMENTS

| | | |
|---|---|---|
| 2,758,987 A | 8/1956 | Salzberg |
| 4,057,537 A | 11/1977 | Sinclair |
| 5,310,865 A | 5/1994 | Enomoto et al. |
| 5,428,126 A | 6/1995 | Kashima et al. |
| 5,968,430 A | 10/1999 | Naito et al. |
| 2009/0169895 A1* | 7/2009 | Nohara et al. ............... 428/407 |

FOREIGN PATENT DOCUMENTS

| | | |
|---|---|---|
| CN | 102407633 A | 4/2012 |
| EP | 0 712 880 A2 | 5/1996 |
| EP | 1683828 A2 | 7/2006 |
| EP | 2573133 A1 | 3/2013 |
| JP | S41-16125 B | 9/1966 |
| JP | S43-23858 B | 10/1968 |
| JP | S44-29522 B | 12/1969 |
| JP | S46-38359 B | 11/1971 |
| JP | S51-22951 B | 7/1976 |
| JP | S60-185816 A | 9/1985 |
| JP | H06-49795 B | 6/1987 |
| JP | H04-46217 B | 7/1987 |
| JP | H06-22919 B | 7/1987 |
| JP | H09-104026 A | 4/1997 |
| JP | H09-104027 A | 4/1997 |
| JP | H10-180888 A | 7/1998 |
| JP | 2000-136261 A | 5/2000 |
| JP | 2002-020525 A | 1/2002 |
| JP | 2003-268143 A | 9/2003 |
| JP | 2004-083890 A | 3/2004 |
| JP | 2006282753 A | 10/2006 |
| JP | 2007-056080 A | 3/2007 |
| JP | 2009-62502 * | 3/2009 |
| JP | 2009-062502 A | 3/2009 |
| JP | 2009-79202 * | 4/2009 |
| JP | 2009-079202 A | 4/2009 |
| JP | 2009-173021 * | 8/2009 |
| JP | 2009-173021 A | 8/2009 |

OTHER PUBLICATIONS

International Search Report for PCT/JP2011/074263, Nov. 22, 2011.
European Supplementary Search Report dated Feb. 26, 2014, for EP 11851369.
Chinese Search Report dated Apr. 16, 2014, for CN 201180061873, and English translation thereof.
European Office Action dated Nov. 21, 2014, for EP 11851369.6.

* cited by examiner

*Primary Examiner* — Leszek Kiliman
(74) *Attorney, Agent, or Firm* — Bacon & Thomas, PLLC

(57) ABSTRACT

Polylactic acid resin expanded beads exhibiting excellent fusion bonding at the time of in-mold molding have such a crystal structure that gives a first time DSC curve when heated according to heat flux differential scanning calorimetry referenced in JIS K7122(1987) and a second time DSC curve when thereafter cooled and then again heated, the second time DSC curve having a fusion peak having a reference peak temperature and the first time DSC curve having at least one fusion peak with a peak temperature higher than the reference peak temperature and another at least one fusion peak with a peak temperature not lower temperature than the reference peak temperature.

8 Claims, 4 Drawing Sheets

POLYLACTIC ACID RESIN EXPANDED BEADS AND MOLDED ARTICLE OF POLYLACTIC ACID RESIN EXPANDED BEADS

FIELD OF THE INVENTION

The present invention relates to polylactic acid resin expanded beads suited for being molded in a mold cavity and to a molded article of the polylactic acid resin expanded beads which is obtained by molding the polylactic acid resin expanded beads in a mold cavity.

BACKGROUND ART

In recent years, with an increase of sensitivity to global environment, polylactic acid receives attention as a carbon neutral material that is a substitute for general resins produced from the conventional petroleum resources. Polylactic acid is produced from a plant such as corn as a starting material and is a thermoplastic resin that is regarded as being of a low environmental load type from the standpoint of carbon neutral. Such polylactic acid is expected to be used as an environmentally gentle, plant-derived general resin for foams. Thus studies are being made on foams made of polylactic acid as a raw material. Among such foams, polylactic acid expanded beads molded articles can be obtained by in-mold molding in any desired shape without restriction, similar to conventional polystyrene expanded beads molded articles and polyolefin expanded beads molded articles. Such molded articles are, thus, promising in that they are likely to allow easy design of properties according to the aimed lightness in weight, cushioning property and heat insulating property.

As regards polylactic acid expanded beads and polylactic acid expanded beads molded articles, inventions disclosed in Patent Documents 1 to 3 have been hitherto proposed.

JP-A-2000-136261 discloses expandable resin particles of an aliphatic polyester such as polylactic acid, in which a volatile blowing agent such as n-pentane has been impregnated in a temperature range in which the degree of crystallization is 0 to 20%. An expanded beads molded article of JP-A-2000-136261 obtained from polylactic acid is prepared by placing the expandable resin particles in a mold and heating them with hot wind to expand and, at the same time, fuse bond the beads together and, therefore, has problems that the density significantly varies with position thereof, fusion bonding between expanded particles and the dimensional stability thereof are not sufficient, and mechanical properties are not satisfactory.

JP-A-2004-83890 discloses expanded beads of a polylactic acid resin which contains at least 50% by mole of lactic acid units, wherein the expanded beads show such characteristics in heat flux scanning differential calorimetry that a difference between the endothermic calorific value and the exothermic calorific value is 0 J/g or more and less than 30 J/g and an endothermic calorific value is 15 J/g or more (indicating that the crystallization has not sufficiently proceeded). Though the polylactic acid resin expanded beads disclosed in JP-A-2004-83890 show an improvement in fusion bonding property between the beads and in secondary expandability, there is a room for further improvement in fusion bonding property in view of the fact that the fusion bonding between the beads is not sufficient when the molded article has a complicated shape and the fusion bonding between the beads in a center region of the molded article is not sufficient when the molded article has a large thickness.

JP-A-2009-62502 discloses polylactic acid resin expanded beads wherein an endothermic calorific value (Rendo) thereof after a heat treatment is within a specific range, an endothermic calorific value (Bendo:J/g) and an exothermic calorific value (Bexo:J/g) thereof before the heat treatment have a specific relationship, and an exothermic calorific value (Bs:J/g) of a surface region thereof before the heat treatment and an exothermic calorific value (Bc:J/g) of a center region thereof have a specific relationship. In the expanded beads, the crystallization has not fully proceeded as a whole and, further, the degree of crystallization in the surface region thereof is lower than that in the center region. Therefore, the expanded beads show excellent inter-bead fusion bonding property and permit production of molded articles having a large thickness or a complicated shape. The above expanded beads, however, require a control of the degree of crystallization thereof in order to satisfy the above-described specific relationship and to obtain improved inter-bead fusion bonding and have a problem in the production efficiency because of the necessity of precise temperature control. For example, whilst it is relatively easy to obtain resin particles having a very low degree of crystallization by rapidly cooling the resin particles at the time the resin particles are formed, expanded beads obtained from the resin particles have so poor reproducibility in their expansion ratio and thermal characteristics that an expanded beads molded article showing good fusion bonding between the beads is not obtained in a stable manner, unless the temperature and time are severely controlled during a step of impregnating the resin particles with a blowing agent and a step of heating and expanding the resin particles impregnated with blowing agent. Therefore, a further improvement in the production efficiency of expanded beads molded articles is demanded.

As described in the foregoing, the conventional polylactic acid resin expanded beads have a problem with respect to fusion bonding between the expanded beads at the time of in-mold molding. Thus, there is a room for further improvement in fusion bonding between the expanded beads, especially when an expanded beads molded article having a complicated shape or a large thickness is to be obtained. The objective problem of the present invention is to provide polylactic acid resin expanded beads showing excellent fusion bonding property in in-mold molding thereof.

SUMMARY OF THE INVENTION

As a result of earnest studies on polylactic acid resin expanded beads in view of the above problems, the present inventors have found that the fusion bonding property of polylactic acid resin expanded beads at the time of in-mold molding is greatly influenced by secondary expansion performance of the polylactic acid resin expanded beads at the time of in-mold molding. Namely, it is believed that, as compared with expanded beads of a general thermoplastic resin such as a polystyrene resin, expanded beads of a polylactic acid resin have a higher speed of response to heating as regards their secondary expansion power and that this is one of the causes of the insufficient fusion bonding of the polylactic acid resin expanded beads at the time of in-mold molding. It has been found that the fusion bonding between expanded beads at the time of in-mold molding can be improved by controlling the crystallization state of polylactic acid resin expanded beads so as to control the secondary expansion performance thereof.

In accordance with the present invention, there are provided polylactic acid resin expanded beads as recited below.
(1) A polylactic acid resin expanded bead, characterized by having such a crystal structure that gives a first time DSC curve when 1 to 4 mg of a measurement specimen sampled from the expanded bead are heated, for melting, according to heat flux differential scanning calorimetry referenced in JIS K7122(1987), from 23° C. to a temperature higher by 30° C. than a fusion peak ending temperature at a heating speed of 10° C./min, and a second time DSC curve when the measurement specimen is then maintained for 10 minutes at the temperature higher by 30° C. than the fusion peak ending temperature, then cooled to 40° C. at a cooling speed of 10° C./min and then again heated, for melting, to a temperature higher by 30° C. than a fusion peak ending temperature at a heating speed of 10° C./min, said second time DSC curve having a fusion peak having a reference peak temperature, said first time DSC curve having both a fusion peak with a peak temperature that is on a higher temperature side than the reference peak temperature (and that is not equal to the reference peak temperature) and a fusion peak with a peak temperature that is on a lower temperature side than the reference peak temperature (or that is equal to the reference peak temperature).

(2) The polylactic acid resin expanded bead according to above (1), wherein the fusion peak with the peak temperature that is on a higher temperature side than the reference peak temperature has a total endothermic calorific value of 1 to 15 J/g.

(3) The polylactic acid resin expanded bead according to above (1), wherein an endothermic calorific value (Brs:endo) [J/g] of a surface region of the expanded bead and an endothermic calorific value (Brc:endo) [J/g] of a center region of the expanded bead, as determined under Condition 1 shown below in accordance with heat flux differential scanning calorimetry referenced in JIS K7122(1987), meet the following formula (1):

$$(Brc:endo) > (Brs:endo) \geq 0 \quad (1).$$

Condition 1
[Preparation of Measurement Specimens]
<Specimen for measuring the Endothermic Calorific Value of the Surface Region of the Expanded Bead>
a surface potion of the expanded bead, including an exterior surface thereof, is cut out and collected to obtain a measurement specimen, such that the entire exterior surface thereof is removed and the measurement specimen has a weight of ⅙ to ¼ the weight of the expanded bead before being cut;
<Specimen for Measuring the Endothermic Calorific Value of the Center Region of the Expanded Bead>
an entire surface portion of the expanded bead is cut away to leave a measurement specimen, such that the measurement specimen has a weight of ⅕ to ⅓ the weight of the expanded bead before being cut;
[Measurement of Endothermic Calorific Values]
the calorific values (Brs:endo) and (Brc:endo) are values determined from DSC curves obtained by first subjecting each of the measurement specimen obtained from the surface region of the expanded bead and the measurement specimen obtained from the center region of the expanded bead to a heat treatment in such a manner that 1 to 4 mg of each of them is heated, for melting, to a temperature higher by 30 C than a fusion peak ending temperature, then maintained at that temperature for 10 minutes, then cooled to 110 C at a cooling speed of 2 C/min, then maintained at that temperature for 120 min, and then cooling the resulting sample to 40 C at a cooling speed of 2 C/min, each of the thus heat treated specimens being subsequently heated again, for melting, to a temperature higher by 30 C than a fusion peak ending temperature at a heating speed of 2 C/min to obtain the DSC curves in accordance with heat flux differential scanning calorimetry referenced in JIS K7122(1987).

(4) The polylactic acid resin expanded bead according to above (3), wherein an endothermic calorific value (Bfc:endo) [J/g] and an exothermic calorific value (Bfc:exo) [J/g] of the center region of the expanded bead, which values are determined in accordance with heat flux differential scanning calorimetry referenced in JIS K7122(1987) under Condition 2 shown below, meet the following formula (2):

$$40 > [(Bfc:endo) - (Bfc:exo)] > 10 \quad (2),$$

Condition 2
[Measurement of endothermic calorific value and exothermic calorific value] the endothermic calorific value (Bfc:endo) and the exothermic calorific value (Bfc:exo) are determined from a DSC curve obtained by heating, for melting, 1 to 4 mg of a measurement specimen, which is sampled in the same manner as that described in Condition 1 for the preparation of a sample for measuring the endothermic calorific value of the center region of the expanded bead, from 23° C. to a temperature higher by 30° C. than a fusion peak ending temperature at a heating speed of 2° C./min in accordance with heat flux differential scanning calorimetry referenced in JIS K7122 (1987).

(5) The polylactic acid resin expanded bead according to above (1), wherein the polylactic acid resin expanded bead has an apparent density of 25 to 400 g/L.

(6) The polylactic acid resin expanded bead according to above (1), wherein the polylactic acid resin expanded bead has an average cell diameter of 30 to 500 μm.

(7) A polylactic acid resin expanded beads molded article obtainable by molding the polylactic acid resin expanded beads according to any one of above (1) to (6) in a mold cavity, said molded article having a bulk density of 15 to 300 g/L.

The polylactic acid resin expanded beads of the present invention (hereinafter occasionally referred to as "expanded beads") have such a crystal structure that shows a hereinafter described low temperature peak and a hereinafter described high temperature peak when the expanded beads are subjected to heat flux differential scanning calorimetry. And, the expanded beads show excellent fusion bonding property at the time of in-mold molding. Thus, the problem of insufficient adhesion bonding between the expanded beads of a polylactic acid resin expanded beads molded article (hereinafter occasionally referred to as "expanded beads molded article") can be solved by the expanded beads of the present invention whose crystal structure has been controlled, irrespective of whether the expanded beads molded article has a simple structure or has such a complicated or large thickness structure that is difficult to be produced by in-mold molding with respect to fusion bonding.

The expanded beads molded article of the present invention excels in fusion bonding between expanded beads and shows an effect of improving dimensional stability and mechanical strength thereof.

DETAILED DESCRIPTION OF EMBODIMENTS OF THE INVENTION

Figure 1:
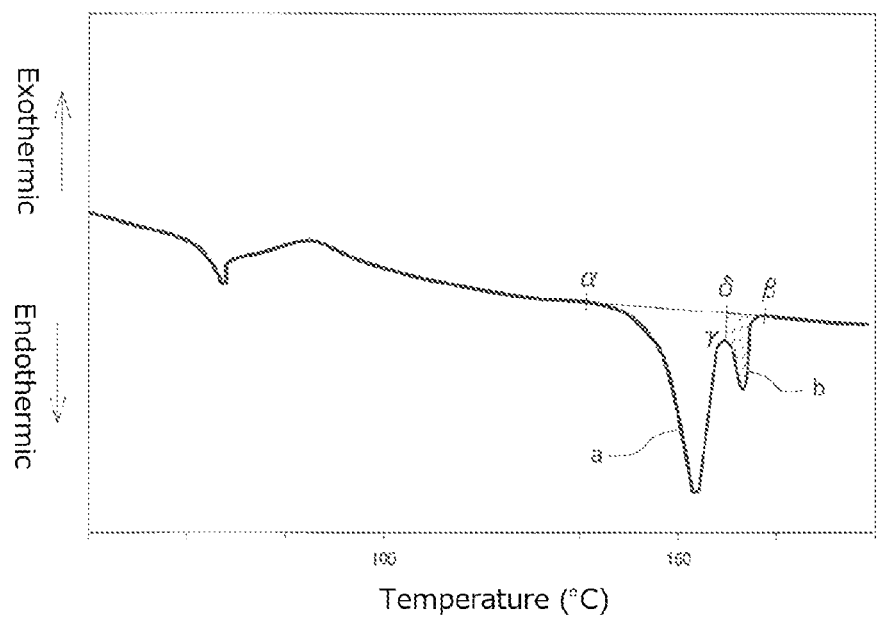
FIG. 1 illustrates an example of a first time DSC curve (I) of expanded beads as measured with a heat flux differential scanning calorimeter.

The polylactic acid resin expanded beads of the present invention will be next described in detail.

The polylactic acid resin expanded beads of the present invention are formed of a polylactic acid resin as a base resin thereof. The term "polylactic acid resin" as used herein is intended to refer to polylactic acid or a mixture of polylactic acid with other resin or resins. The polylactic acid is preferably a polymer containing at least 50 mol % of lactic acid monomer component units. Examples of the polylactic acid include (a) a polymer of lactic acid, (b) a copolymer of lactic acid with other aliphatic hydroxycarboxylic acid or acids, (c) a copolymer of lactic acid with an aliphatic polyhydric alcohol and an aliphatic polycarboxylic acid, (d) a copolymer of lactic acid with an aliphatic polycarboxylic acid, (e) a copolymer of lactic acid with an aliphatic polyhydric alcohol, and (f) a mixture of two or more of (a)-(e) above. Examples of the polylactic acid also include so-called stereocomplex polylactic acid and stereoblock polylactic acid. Specific examples of the lactic acid include L-lactic acid, D-lactic acid, DL-lactic acid, a cyclic dimer thereof (i.e. L-lactide, D-lactide or DL-lactide) and mixtures thereof.

Examples of other aliphatic hydroxycarboxylic acid in (b) above include glycolic acid, hydroxybutyric acid, hydroxyvaleric acid, hydroxycaproic acid and hydroxyheptoic acid. Examples of the aliphatic polyhydric alcohol in (c) and (e) above include ethylene glycol, 1,4-butanediol, 1,6-hexanediol, 1,4-cyclohexanedimethanol, neopentyl glycol, decamethylene glycol, glycerin, trimethylolpropane and pentaerythritol. Examples of the aliphatic polycarboxylic acid in (c) and (d) above include succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride.

As specific examples of the method for preparing polylactic acid used in the present invention, there may be mentioned a method in which lactic acid or a mixture of lactic acid and aliphatic hydroxycarboxylic acid is subjected to a direct dehydration polycondensation (preparation method disclosed, for example, in U.S. Pat. No. 5,310,865); a method in which a cyclic dimer of lactic acid (namely lactide) is subjected to ring-open polymerization (preparation method disclosed, for example, in U.S. Pat. No. 2,758,987); a method in which cyclic dimers of lactic acid and an aliphatic hydroxycarboxylic acid, such as lactide and glycolide, and s-caprolactone are subjected to ring-open polymerization in the presence of a catalyst (preparation method disclosed, for example, in U.S. Pat. No. 4,057,537); a method in which a mixture of lactic acid, an aliphatic dihydric alcohol and an aliphatic dibasic acid is subjected to direct dehydration polycondensation (disclosed, for example, in U.S. Pat. No. 5,428,126); a method in which lactic acid, an aliphatic dihydric alcohol and an aliphatic dibasic acid are subjected to polycondensation in an organic solvent (preparation method disclosed, for example, in EP-A-0712880A2); and a method in which a lactic acid polymer is subjected to dehydration polycondensation in the presence of a catalyst to produce a polyester and in which at least one step of polymerization in a solid phase is involved during the course of the polycondensation. The method for producing polylactic acid is not limited to the above methods. The above methods may be performed in the presence of a minor amount of an aliphatic polyhydric alcohol (e.g. glycerin), an aliphatic polybasic acid (e.g. butanetetracarboxylic acid) or polyhydric alcohol (e.g. polysaccharide) to obtain a copolymer. It is also possible to use a binder (polymer chain extender) such as a polyisocyanate compound to increase the molecular weight. The polylactic acid may also be branched using a branching agent, typically an aliphatic polyhydric alcohol such as pentaerythritol.

The polylactic acid used in the present invention is preferably capped at its molecular chain ends. By this, it is possible to surely suppress hydrolysis during the course of the preparation of polylactic acid resin expanded beads, so that the dispersing medium release foaming method (hereinafter described) can be much easily carried out. Namely, it becomes easy to reliably produce polylactic acid resin expanded beads that show a high temperature peak without significant care about the hydrolysis which will cause deterioration of physical properties of the resin and that are capable of withstanding hydrolysis during in-mold molding. Additionally, a polylactic acid resin expanded beads molded article obtained by in-mold molding has improved durability.

Examples of such an end capping agent include carbodiimide compounds, oxazoline compounds, isocyanate compounds and epoxy compounds. Above all, carbodiimide compounds are preferred. Specific examples of the diimide compounds include an aromatic monocarbodiimide such as bis(dipropylphenyl)carbodiimide (e.g. Stabaxol 1-LF produced by Rhein Chemie), an aromatic polycarbodiimide (e.g. Stabaxol P produced by Rhein Chemie and Stabaxol P400 produced by Rhein Chemie) and an aliphatic polycarbodiimide such as poly(4,4'-dicyclohexylmethanecarbodiimide (e.g. Carbodilite LA-1 produced by Nisshinbo Chemical Inc.).

These end capping agents may be used alone or in combination of two or more thereof. The using amount of the end capping agent is preferably 0.1 to 5 parts by weight, more preferably 0.5 to 3 parts by weight, per 100 parts by weight of the polylactic acid.

Thus, the polylactic acid used in the present invention is preferably a modified polylactic acid resin that is modified with at least one modifying agent selected from the group consisting of carbodiimide compounds, epoxy compounds and isocyanate compounds, more preferably a modified polylactic acid modified with a carbodiimide compound.

As described previously, the base resin from which the expanded beads of the present invention are formed, may contain other resin or resins as long as the object and effect of the present invention are not adversely affected. In this case, the hereinafter described constitution, such as endothermic calorific values and exothermic calorific values, may change by the addition of other resin or resins. When a mixed resin containing polylactic acid and other resin or resins is used as the base resin, it is not necessary that the base resin formed of the mixed resin should meet the constitution concerning the endothermic calorific values and exothermic calorific values. Rather, in the mixed resin composed of polylactic acid and other resin or resins, it is sufficient that only the polylactic acid should meet the constitution concerning the endothermic calorific values and exothermic calorific values.

In the present invention, when the polylactic acid resin is a mixed resin composed of polylactic acid and other resin or resins, it is preferred that the polylactic acid be contained in the mixed resin in an amount of at least 50% by weight, more preferably at least 70% by weight, still more preferably at least 90% by weight. Examples of the other resin to be mixed with the polylactic acid include a polyethylene resin, a polypropylene resin, a polystyrene resin and a polyester resin. Above all, the use of a biodegradable aliphatic polyester resin containing at least 35 mol % of aliphatic ester component units is preferred. Examples of the aliphatic polyester resin include a polycondensation product of a hydroxyacid other than polylactic acid resins, a ring open polymerization product of a lactone (e.g. polycaprolactone), and a polycondensation product of an aliphatic polyhydric alcohol with an aliphatic polycarboxylic acid, such as polybutylene succinate, polybutylene adipate, polybutylene succinate adipate and poly(butylene adipate terephthalate).

Examples of additives that may be compounded in the expanded beads of the present invention include a coloring agent, a flame retardant, an antistatic agent, a weatherability agent and an electric conductivity imparting agent.

When the base resin is mixed with additives, the additives may be kneaded as such together with the base resin. In view of dispersing efficiency of the additives into the base resin, however, the additives are generally formed into a master batch which is then kneaded with the base resin. The additives are preferably added in an amount of 0.001 to 20 parts by weight, more preferably 0.01 to 5 parts by weight, per 100 pars by weight of the base resin, though the amount varies with the kind of the additives.

The polylactic acid resin expanded beads according to the present invention may be obtained by, for example, a method including heating and melting the above-described polylactic acid resin, extruding the resulting melt into strands, cutting the strands to obtain polylactic acid resin particles, and expanding the obtained resin particles. The expanded beads have such a crystal structure that gives a first time DSC curve (hereinafter occasionally referred to as "first time DSC curve (I)") when the expanded beads are heated, according to heat flux differential scanning calorimetry referenced in JIS K7122(1987), from 23° C. to a temperature higher by 30° C. than a fusion peak ending temperature at a heating speed of 10° C./min, and a second time DSC curve (hereinafter occasionally referred to as "second time DSC curve (I)") when the expanded beads are then maintained at the temperature higher by 30° C. than the fusion peak ending temperature for 10 minutes, then cooled to 40° C. at a cooling speed of 10° C./min and then again heated, for melting, to a temperature higher by 30° C. than a fusion peak ending temperature at a heating speed of 10° C./min.

The first time DSC curve has at least one fusion peak (hereinafter occasionally referred to as "high temperature peak") having a peak temperature which is on a higher temperature side than a reference peak temperature (and which is not the same as the reference peak temperature), and another at least one fusion peak (hereinafter occasionally referred to as "low temperature peak") having a peak temperature which is on a lower temperature side than the reference peak temperature (or which may be the same as the reference peak temperature). The reference peak temperature is a "peak temperature of a fusion peak of the second time DSC curve". When, in the second time DSC curve (I), there are a plurality of fusion peaks or when there is a shoulder on high temperature side a fusion peak, then the "peak temperature of a fusion peak of the second time DSC curve (I)" is the peak temperature of the fusion peak or the flection point temperature of the shoulder that is the highest among the peak temperatures of the fusion peaks and the flection point temperatures of the shoulders.

It is believed that the expanded beads of the present invention, which shows the high temperature peak, suppress either secondarily expanding speed of the expanded beads or excessive secondary expansion of the expanded beads, or else, suppress both of them during in-mold molding of the expanded beads, so that the flow of a heating medium through the expanded beads during the in-mold molding stage is less blocked. As a result, the fusion bonding of the expanded beads during the in-mold molding is improved. It follows that the obtained polylactic acid resin expanded beads molded article shows excellent fusion bonding even when the thickness thereof is large or the shape thereof is complicated.

The above-described high temperature peak appears in a first time DSC curve (I) obtained in the measurement of the expanded beads by differential scanning calorimetry, but does not appear in a second time DSC curve (I). The high temperature peak that appears in the first time DSC curve (I) of the expanded beads is attributed to crystal growth of the polylactic acid resin during a heat treatment which will be described hereinafter. The low temperature peak that appears in the first time DSC curve (I) of the expanded beads is a fusion peak which appears in the case of ordinary forming process of the polylactic acid resin and which is attributed to the intrinsic crystal structure thereof.

The phenomenon of appearance of such a high temperature peak in the first time DSC curve (I) of the expanded beads is considered to be ascribed to secondary crystals formed through the thermal history in a process for expanding resin particles to obtain the expanded beads.

Figure 2:
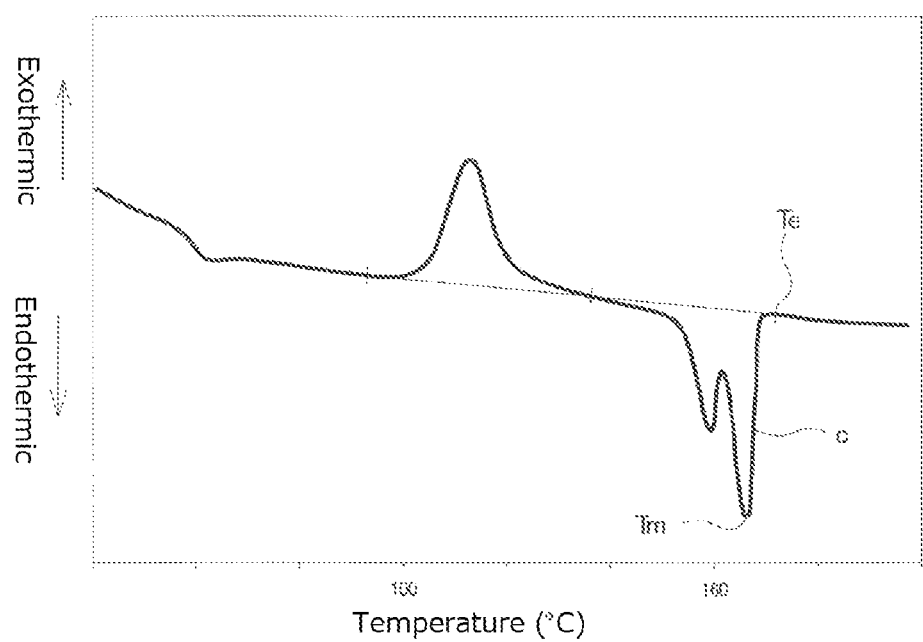
FIG. 2 illustrates an example of a second time DSC curve (I) of expanded beads as measured with a heat flux differential scanning calorimeter.

FIG. 1 illustrates an example of the first time DSC curve (I) and FIG. 2 illustrates an example of the second time DSC curve (I). From a comparison of FIG. 1 and FIG. 2, it will be seen that, when the peak temperature of the higher temperature-side fusion peak among the two fusion peaks in FIG. 2 is regarded as being a reference peak temperature, the high temperature peak is a fusion peak in FIG. 1 which has a peak temperature higher than the reference peak temperature, while the low temperature peak is a fusion peak which has a peak temperature lower than the reference peak temperature. That is, in FIG. 1, the low temperature peak is a fusion peak "a" while the high temperature peak is a fusion peak "b".

In the present specification, a peak temperature of a fusion peak that has the largest area in the second time DSC curve (I), i.e. the peak temperature of the fusion peak "c" is defined as a melting point Tm of the polylactic acid resin, and the temperature at which the skirt of the fusion peak returns to a high temperature-side base line is defined as a fusion peak ending temperature Te.

Incidentally, although the two fusion peaks "a" and "b" in FIG. 1 are each shown as a smooth curve, DSC curves are not always smooth. There are cases where a plurality of overwrapped fusion peaks appear in DSC curves so that a plurality of low temperature peaks and high temperature peaks are present in DSC curves.

The calorific value (J/g) of the high temperature peak is determined from the first time DSC curve (I) shown in FIG. 1 as follows. A straight line connecting a point α which is a point where an endothermic peak begins separating from a low temperature-side base line and a point β which is a point where the endothermic peak returns to a high temperature-side base line is drawn. Next, a line which is in parallel with the ordinate and which passes a point γ in the DSC curve at the bottom of the valley between the low temperature peak "a" and the high temperature peak "b" is drawn. This line crosses the line connecting the points α and β at a point δ. The calorific value of the high temperature peak is an amount of endotherm corresponding to the area (shaded portion in FIG. 1) defined by the line connecting the points γ and δ, the line connecting the points δ and β, and the DSC curve (I). Incidentally, there is a case where an exothermic peak contiguous with the fusion peak "a" appears in the low-temperature side of the fusion peak "a" (this is not the case in FIG. 1), so that it is difficult to determine the point a as a point at which the fusion peak begins separating from the low temperature-side base line in the above-described manner. In such a case, the point a is determined as a point at which the exothermic peak begins separating from the low temperature-side base line.

The endothermic calorific value of the high temperature peak (when the high temperature peak is constituted of a plurality of fusion peaks, a total endothermic calorific value of the fusion peaks) is preferably 1 to 15 J/g. When the expanded beads, whose high temperature peak has an excessively small endothermic calorific value, are heated with steam at the time of in-mold molding, those portions of the expanded beads located near the surface of the mold primarily undergo secondary expansion beyond necessary. As a result, the heating medium such as steam is prevented from sufficiently flowing into a central portion or narrowed portion of the mold cavity filled with the expanded beads. Accordingly, it becomes difficult to obtain an expanded beads molded article having good fusion bonding. When the high temperature peak has an excessively large endothermic calorific value, on the other hand, the expanded beads cannot sufficiently secondarily expand. As a result, it becomes difficult to obtain an expanded beads molded article having good fusion bonding between the expanded beads and good appearance. For these reasons, the calorific value of the high temperature peak is more preferably 1 to 12 J/g, particularly preferably 2 to 10 J/g. The upper limit of the calorific value of the high temperature peak is generally 25 J/g.

Description will be next made on the expanded bead of the present invention that has preferred characteristics owing to the fact that the polylactic acid resin expanded bead has not only the above-described high temperature peak but also a specific constitution described hereinbelow.

Namely, it is preferred that the polylactic acid resin expanded bead of the present invention not only has the above-described low temperature peak and high temperature peak but also satisfies a relationship represented by the following formula (1):

$$(Brc\text{:endo}) > (Brs\text{:endo}) \geq 0 \qquad (1)$$

wherein (Brs:endo) is an endothermic calorific value [J/g] of a surface region of the expanded bead after a heat treatment and (Brc:endo) is an endothermic calorific value [J/g] of a center region of the expanded bead after the heat treatment, as determined under Condition 1 shown below in accordance with heat flux differential scanning calorimetry.

The fact that the above formula (1) is met means that when the expanded bead is heat treated under such conditions that crystallization of the polylactic acid which constitutes the surface region and center region of the expanded bead sufficiently proceeds, the amount of the polylactic acid crystal components that constitute the surface region of the expanded bead is smaller than the amount of the polylactic acid crystal components that constitute the center region of the expanded bead. This means that, when the expanded bead is sufficiently heat treated, the crystallization degree of the polylactic acid in the center region is increased. Because of the improved crystallization degree of the polylactic acid in the center region of the expanded bead, the expanded bead can show improved heat resistance, etc. as a whole. On the other hand, since the polylactic acid in the surface region of the expanded bead has a lower crystallization degree as compared with that in the center region of the expanded bead even when the expanded bead is sufficiently heat treated, the softening point of surface region of the expanded bead is low. Therefore, such expanded bead is capable of showing excellent fusion bonding between the expanded beads during an in-mold molding stage, irrespective of the thermal history before and after the fabrication of the expanded beads. From this point of view, the endothermic calorific value (Brs:endo) of the surface region of the expanded bead is preferably 35 J/g or less (inclusive of 0) for reasons of improved fusion bonding property of the expanded bead. For reasons of improved heat resistance and mechanical strength of the expanded bead, the endothermic calorific value (Brc:endo) of the center region of the expanded bead is preferably 30 J/g or more, more preferably 35 J/g or more. The upper limit of (Brc:endo) is generally 70 J/g, preferably 60 J/g. It is also preferred that between (Brc:endo) and (Brs:endo) there is a difference in calorific value of at least 3 J/g, more preferably at least 4 J/g. Meanwhile, as long as the formula (1) is met, the polylactic acid that constitutes the surface region of the expanded bead may be non-crystalline polylactic acid or a mixture of non-crystalline polylactic acid and crystalline polylactic acid.

It is preferred that a great difference exist between (Brc:endo) and (Brs:endo) values for the reasons as described above, such as improvement of fusion bonding. In actual, however, a great difference is not seen between them. The reason for this is considered to be as follows. Namely, when a polylactic acid resin particle used for the formation of the expanded bead is, for example, a multi-layered resin particle composed of a core layer and an outer layer which is positioned on a surface side of the core layer and which has a softening point differing from that of the core layer by a specific difference, it is difficult to cut out a measurement specimen (for the measurement of (Brs:endo) of the surface region of the expanded bead) only from the outer layer of the expanded bead. Thus, the measurement specimen of the surface region for the measurement of (Brs:endo) inevitably includes a part of the core layer in addition to the outer layer. As a consequence, the measured value of (Brs:endo) does not greatly differ from that of (Brc:endo).

In the polylactic acid resin expanded bead according to the present invention, it is preferred that the expanded bead show a low temperature peak and a high temperature peak and satisfy the above formula (1) after heat treatment and, further, that an endotherm calorific value (Br:endo) [J/g] of the whole expanded bead after a heat treatment meet the following formula (3):

$$(Br\text{:endo}) > 25 \qquad (3)$$

The fact that (Br:endo) exceeds 25 [J/g] as indicated in the above formula (3) means that, when the expanded bead is heat treated under such conditions that crystallization of the polylactic acid which constitutes the expanded bead sufficiently proceeds, the amount of the polylactic acid crystal components in the expanded bead is large. Namely, when the heat treatment is carried out sufficiently, the crystallization degree of the polylactic acid which constitutes a greater part of the expanded bead (which part corresponds to the core region of the multi-layered resin particle) is increased, so that it is possible to obtain an expanded beads molded article having an increased degree of crystallization. Therefore, it is expected that the obtained expanded beads molded article will show improved mechanical strength and heat resistance such as compressive strength at a high temperature. From this point of view, (Br:endo) is preferably 30 [J/g] or more, more preferably 35 [J/g] or more. The upper limit of (Br:endo) is generally 70 [J/g], preferably 60 [J/g].

As used herein, the endothermic calorific value (Brs:endo) [J/g] of a surface region of the expanded bead, the endothermic calorific value (Brc:endo) [J/g] of a center region of the expanded bead and the endothermic calorific value (Br:endo) [J/g] of the whole expanded bead are values as determined in accordance with heat flux differential scanning calorimetry referenced in JIS K7122(1987) under the following Condition 1.

Condition 1

[Preparation of Measurement Specimens]

<Specimen for Measuring the Endothermic Calorific Value of the Whole Expanded Bead>

The expanded bead is basically used as a measurement specimen as such without cutting.

<Specimen for Measuring the Endothermic Calorific Value of the Surface Region of the Expanded Bead>

A surface potion of the expanded bead, including an exterior surface thereof, is cut out and collected to obtain a measurement specimen, such that the entire exterior surface thereof is removed and the measurement specimen has a weight of ⅙ to ¼ the weight of the expanded bead before being cut. More specifically, the expanded bead is cut using a cutter knife or the like for collecting the surface portion as the measurement specimen. In this case, it should be borne in mind that the entire exterior surface of the expanded bead should be removed, the thickness of the surface portion removed should be as equal as possible and the weight of the surface portion removed from the bead should be within the range of ⅙ to ¼ the weight of the expanded bead before being cut.

<Specimen for Measuring the Endothermic Calorific Value of the Center Region of the Expanded Bead>

An entire surface portion of the expanded bead is cut away to leave a measurement specimen, such that the measurement specimen has a weight of ⅕ to ⅓ the weight of the expanded bead before being cut. More specifically, the expanded bead is cut using a cutter knife or the like for the purpose of obtaining an inside region of the foam of the expanded bead which region does not include the exterior surface of the expanded bead. It should be borne in mind that the entire exterior surface of the expanded bead should be removed and a center region of the expanded bead which has a weight of ⅕ to ⅓ the weight of the expanded bead before being cut should be cut out, with the center of the center region being made as close to the center of the expanded bead as possible. In this case, the shape of the measurement specimen thus cut out is desired to be as similar as possible to the shape of the expanded bead.

[Measurement of Endothermic Calorific Values]

The calorific values (Br:endo), (Brs:endo) and (Brc:endo) are values as determined from DSC curves obtained by first subjecting each of the expanded bead, the measurement specimen obtained from the surface region of the expanded bead and the measurement specimen obtained from the center region of the expanded bead to a heat treatment in which 1 to 4 mg of each of them is heated, for melting, to a temperature higher by 30 C than a fusion peak ending temperature, then maintained at that temperature for 10 minutes, then cooled to 110° C. at a cooling speed of 2° C./min and then maintained at that temperature for 120 min, and then cooling the resulting sample to 40° C. at a cooling speed of 2° C./min. each of the thus heat treated specimens being subsequently heated again, for melting, to a temperature higher by 30° C. than a fusion peak ending temperature at a heating speed of 2° C./min to obtain the DSC curve (hereinafter occasionally referred to as "second time DSC curve (II)") in accordance with heat flux differential scanning calorimetry referenced in JIS K7122 (1987). When the amount of the measurement specimen sampled for measurement of (Brs:endo) or (Brc:endo) is less than the intended amount of 1 to 4 mg, the above-described sampling procedure should be repeated for two or more expanded beads until the measurement specimen in the intended amount of 1 to 4 mg is collected. When the weight of one expanded bead sampled for measurement of (Br:endo) exceeds 4 mg, the expanded bead should be divided into parts with an equal shape (such as into halves) so that the measurement specimen has a weight within the range of 1 to 4 mg.

Figure 3:
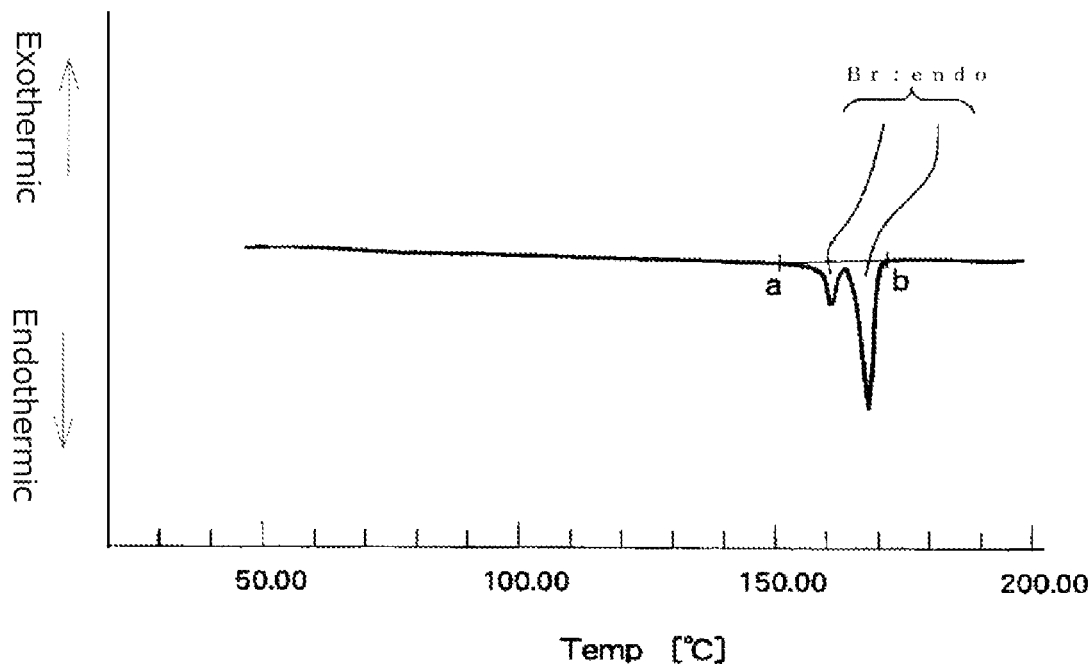
FIG. 3 illustrates an example of a second time DSC curve (II) showing an endothermic calorific value (Br:endo) of a measurement sample as measured with a heat flux differential scanning calorimeter.
Figure 4:
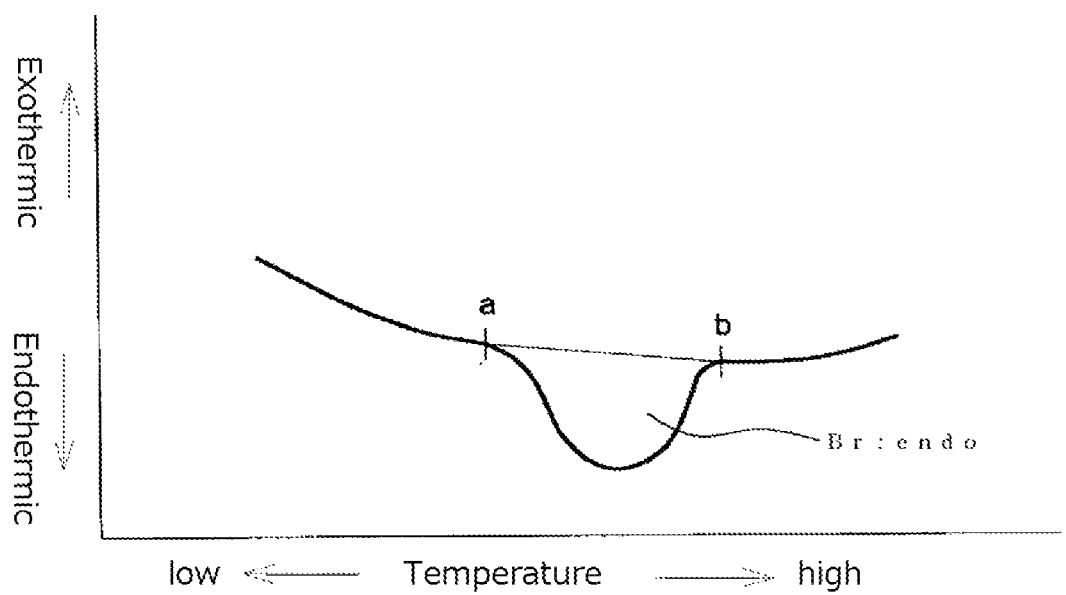
FIG. 4 illustrates an example of a second time DSC curve (II) showing an endothermic calorific value (Br:endo) of a measurement sample as measured with a heat flux differential scanning calorimeter.

FIG. 3 shows a second time DSC curve (II) in which a point "a" is a point where an endothermic peak begins separating from a low temperature-side base line and a point "b" is a point where the endothermic peak returns to a high temperature-side base line. The endothermic calorific value (Br:endo) is an area defined by a line passing the points "a" and "b" and the DSC curve. The DSC device should be preferably operated so that the base line is as straight as possible. When the base line is inevitably curved as shown in FIG. 4, the curved base line on the low temperature side is extended to the high temperature side with the radius of the curvature of the base line being maintained. The point at which the endothermic peak begins separating from the low temperature side curved base line is the point "a". Similarly, the curved base line on the high temperature side is extended to the low temperature side with the radius of the curvature of the base line being maintained. The point at which the endothermic peak returns to the high temperature side curved base line is the point "b". The endothermic calorific values (Brs:endo) and (Brc:endo) may also be obtained from their second DSC curves (II) by drawing base lines in the same manner as in the case of (Bnendo) and may be each determined from the area defined by a line passing the points "a" and "b" and the DSC curve.

In the above-described measurement of the endothermic calorific values (Brs:endo). (Brc:endo) and (Bnendo), each of the specimens is measured for its DSC curve under conditions including the maintenance at 110° C. for 120 minutes, cooling at a rate of 2° C./min and heating at a rate of 2° C./min. This is for the purpose of determining the endothermic calorific values (Brs:endo), (Brc:endo) and (Bnendo) in the state in which crystallization of the polylactic acid resin of each specimen has been allowed to proceed as much as possible.

Since the endothermic calorific value (Brs:endo) of the surface region of the expanded bead is lower than the endothermic calorific value (Brc:endo) of the center region thereof, the softening point of the surface of the expanded bead may be maintained in a low level, irrespective of the thermal history of the expanded bead, so that the expanded bead shows excellent fusion bonding property when subjected to in-mold molding. Further, when the expanded bead as a whole has the above-described specific (Br:endo), it is possible to obtain an expanded beads molded article having excellent mechanical properties, when such expanded beads are in-mold molded after having been subjected to a heat treatment or when such expanded beads are in-mold molded and then subjected to a heat treatment.

It is preferred that the polylactic acid resin expanded bead of the present invention be such that an endothermic calorific value (Bfc:endo) [J/g] and an exothermic calorific value (Bfc:exo) of the center region of the expanded bead before being subjected to the heat treatment, which values are determined in accordance with heat flux differential scanning calorimetry referenced in JIS K7122(1987) under Condition 2 shown below, meet the following formula (2):

$$40 > [(Bfc\text{:endo}) - (Bfc\text{:exo})] > 10 \quad (2)$$

Condition 2
[Preparation of Measurement Specimen]
[Measurement Specimen for Measuring Endothermic Calorific Value and Exothermic Calorific Value of the Center Region of the Expanded Bead]

In the same manner as the preparation method for the specimen for measuring the endothermic calorific value of the center region of the expanded bead that is described in Condition 1, an entire surface portion of the expanded bead is cut away to leave a measurement specimen, such that the measurement specimen has a weight of ⅕ to ⅓ the weight of the expanded bead before being cut.

[Measurement of Endothermic Calorific Value and the Exothermic Calorific Value]

The endothermic calorific value (Bfc:endo) and the exothermic calorific value (Bfc:exo) are determined from a DSC curve (first time DSC curve (II)) obtained by heating, for melting, 1 to 4 mg of the measurement specimen, sampled from the center region of the expanded bead, from 23° C. to a temperature higher by 30° C. than a fusion peak ending temperature at a heating speed of 2° C./min in accordance with heat flux differential scanning calorimetry referenced in JIS K7122(1987). When the amount of the measurement specimen sampled from one expanded bead is less than the intended amount of 1 to 4 mg, the above-described sampling procedure should be repeated for a plurality of expanded beads until 1 to 4 mg of a measurement specimen is collected.

The difference [(Bfc:endo)-(Bfc:exo)] in the above formula (2) represents a difference between the endothermic calorific value (Bfc:endo) that is an energy absorbed when the crystals, which are originally contained in the center region of the expanded bead before the heat flux differential scanning calorimetry measurement is carried out, and crystals, which have been formed in the center region of the expanded bead during the course of heating in the measurement, are melted and the exothermic calorific value (Bfc:exo) that is an energy emitted when the center region of the expanded bead crystallizes during the course of heating in the heat flux differential scanning calorimetry measurement. The fact that the difference is small means that crystallization of the center region of the expanded bead has not yet proceeded before the heat flux differential scanning calorimetry is carried out, while the fact that the difference is large and is near the endothermic calorific value (Bfc:endo) means that crystallization of the center region of the expanded bead has already fully proceeded before the heat flux differential scanning calorimetry is carried out. The difference [(Bfc:endo)-(Bfc:exo)] is preferably within the above-described range for reasons that good secondary expansion property of the expanded bead during an in-mold molding stage is achieved and, further, the range of the molding temperature within which good expanded beads molded articles are obtainable becomes wide. The difference is more preferably 35 J/g or less, particularly preferably 30 J/g or less, from the view point of the secondary expansion property.

From the view point of easiness in controlling the temperature of in-mold molding step as well as prevention of shrinkage of the in-mold molded articles, the difference [(Bfc:endo)-(Bfc:exo)] is preferably 15 J/g or more, particularly preferably 20 J/g or more.

It is also preferred that the endothermic calorific value (Bfc:endo) of the expanded bead of the present invention is 30 to 70 J/g. With an increase of the endothermic calorific value (Bfc:endo), the degree of crystallization of the polylactic acid resin of which the expanded bead is formed becomes higher upon a heat treatment of the expanded bead, so that the expanded beads molded article prepared therefrom has higher mechanical strength. When the endothermic calorific value (Bfc:endo) is excessively small, on the other hand, there is a possibility that the mechanical strength, especially mechanical strength at high temperatures, of the final expanded beads molded article is unsatisfactory. From this point of view, (Bfc:endo) is more preferably 35 J/g or more. The upper limit of (Bfc:endo) is generally 70 J/g, preferably 60 J/g.

The exothermic calorific value (Bfc:exo)] is preferably 5 to 30 J/g, more preferably 10 to 25 J/g, for reasons of good secondary expansion property and fusion bonding property of the expanded bead at the time of in-mold molding, in view of controllability of the difference [(Bfc:endo)-(Bfc:exo)] and the endothermic calorific value (Bfc:endo). The fact that the exothermic calorific value (Bfc:exo) is high means that crystallization of the center region of the expanded bead formed of crystalline polylactic acid has not yet proceeded before the heat flux differential scanning calorimetry measurement.

The exothermic calorific value (Bfc:exo) and the endothermic calorific value (Bfc:endo) as used herein are determined by the heat flux differential scanning calorimetry (the above-described Condition 2) in accordance with JIS K7122(1987), as described previously. The measurement of the exothermic calorific value (Bfc:exo) and the endothermic calorific value (Bfc:endo) is carried out as follows. In a first time DSC curve (II), when a point where the exothermic peak (this has the same meaning as crystallization peak) begins separating from a low temperature-side base line of the exothermic peak is assigned as point "c" and a point where the exothermic peak returns to a high temperature-side base line is assigned as point "d", the exothermic calorific value (Bfc:exo) is a calorific value determined from the area defined by a line passing the points "c" and "d" and the DSC curve. In the first time DSC curve (II), when a point where the fusion peak (this has the same meaning as endothermic peak) begins separating from a low temperature-side base line is assigned as point "e" and a point where the endothermic peak returns to a high temperature-side base line is assigned as point "f", the endothermic calorific value (Bfc:endo) is a calorific value determined from the area defined by a line passing the points "e" and "f" and the DSC curve. The DSC device should be preferably operated so that the base line of the first time DSC curve (II) is as straight as possible. When the base line is inevitably curved, the curved base line on the low temperature side of the exothermic peak is extended to the high temperature side with the radius of the curvature of the base line being maintained. The point at which the exothermic peak begins separating from the low temperature side curved base line is the point "c". Similarly, the curved base line on the high temperature side of the exothermic peak is extended to the low temperature side with the radius of the curvature of the base line being maintained. The point at which the exothermic peak returns to the high temperature side curved base line is the point "d". Further, the curved base line on the low temperature side of the endothermic peak is extended to the high temperature side with the radius of the curvature of the base line being maintained. The point at which the endothermic peak begins separating from the low temperature side curved base line is the point "e". Similarly, the curved base line on the high temperature side of the endothermic peak is extended to the low temperature side with the radius of the curvature of the base line being maintained. The point at which the endothermic peak returns to the high temperature side curved base line is the point "f".

Figure 5:
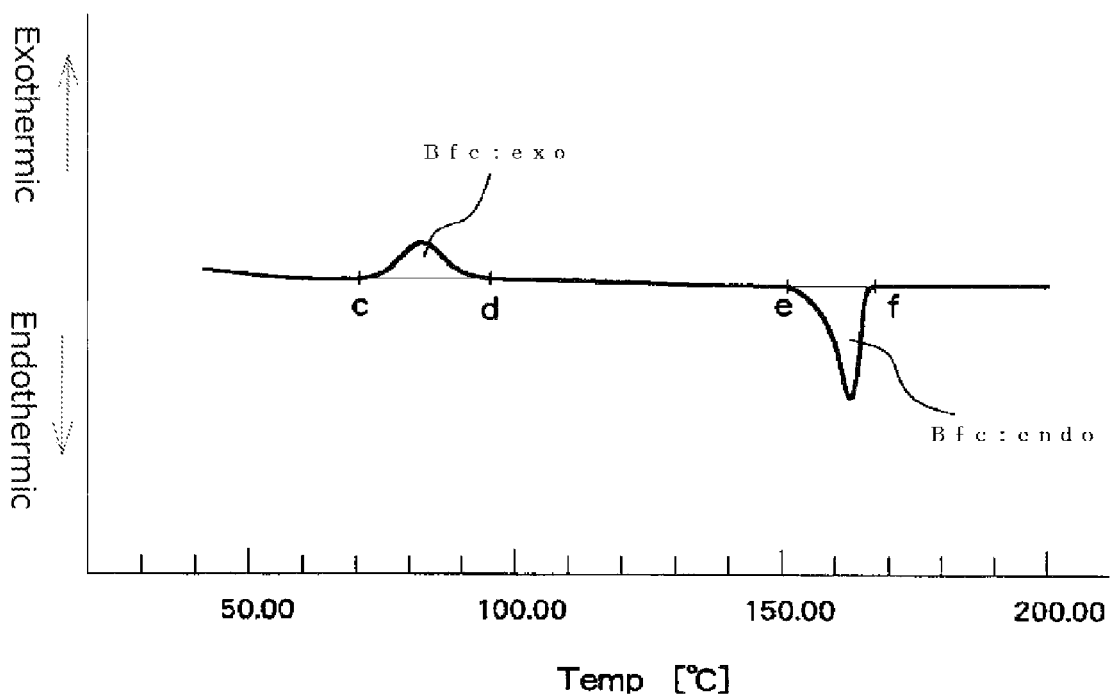
FIG. 5 illustrates an example of a first time DSC curve (II) showing an exothermic calorific value (Bfc:exo) and an endothermic calorific value (Bfc:endo) of a measurement sample as measured with a heat flux differential scanning calorimeter.
Figure 6:
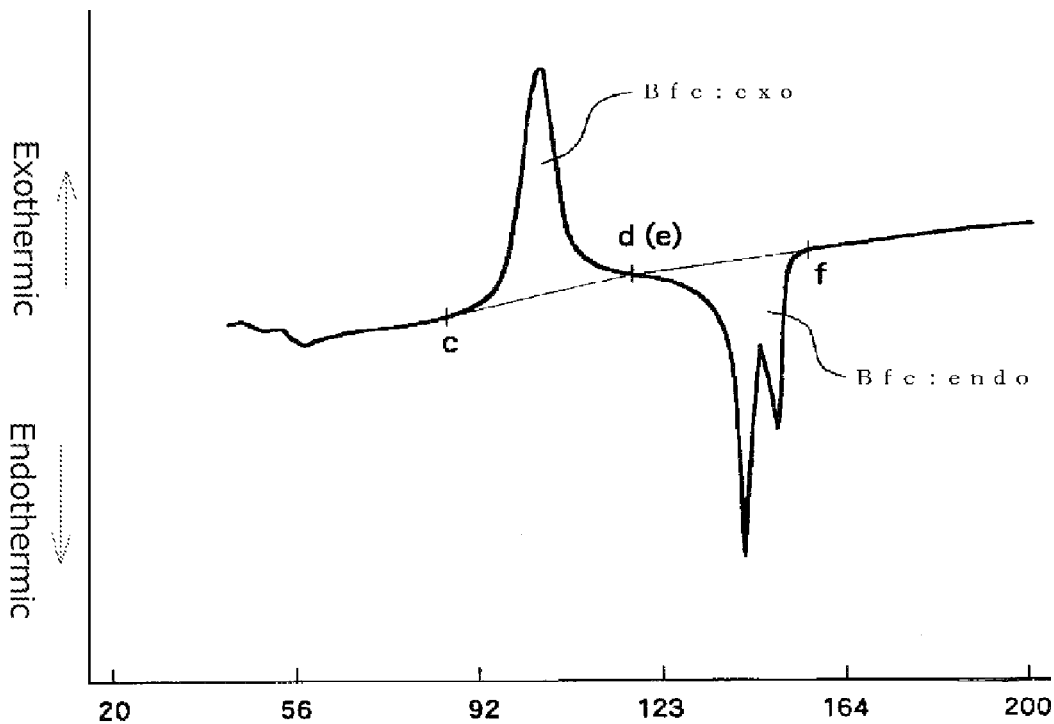
FIG. 6 illustrates an example of a first time DSC curve (II) showing an exothermic calorific value (Bfc:exo) and an endothermic calorific value (Bfc:endo) of a measurement sample as measured with a heat flux differential scanning calorimeter.

In the case of FIG. 5, for example, an exothermic calorific value (Bfc:exo) is a calorific value determined from the area which is defined by the straight line passing the points "c" and "d", that are determined in the manner described above, and the DSC curve and which represents the generated calorific value, while an endothermic calorific value (Bfc:endo) is a calorific value determined from the area which is defined by the straight line passing the points "e" and "f" and the DSC curve and which represents the absorbed calorific value. In the case of FIG. 6, it is difficult to determine points "d" and "e" by the above-described method. Thus, in the illustrated case, points "c" and "f" are first determined by the above-described method and a point at which the straight line passing the points "c" and "f" intersects the DSC curve is assigned as the point "d" (also point "e"), whereupon the exothermic calorific value (Bfc:exo) and the endothermic calorific value (Bfc:endo) of the expanded bead are determined.

Figure 7:
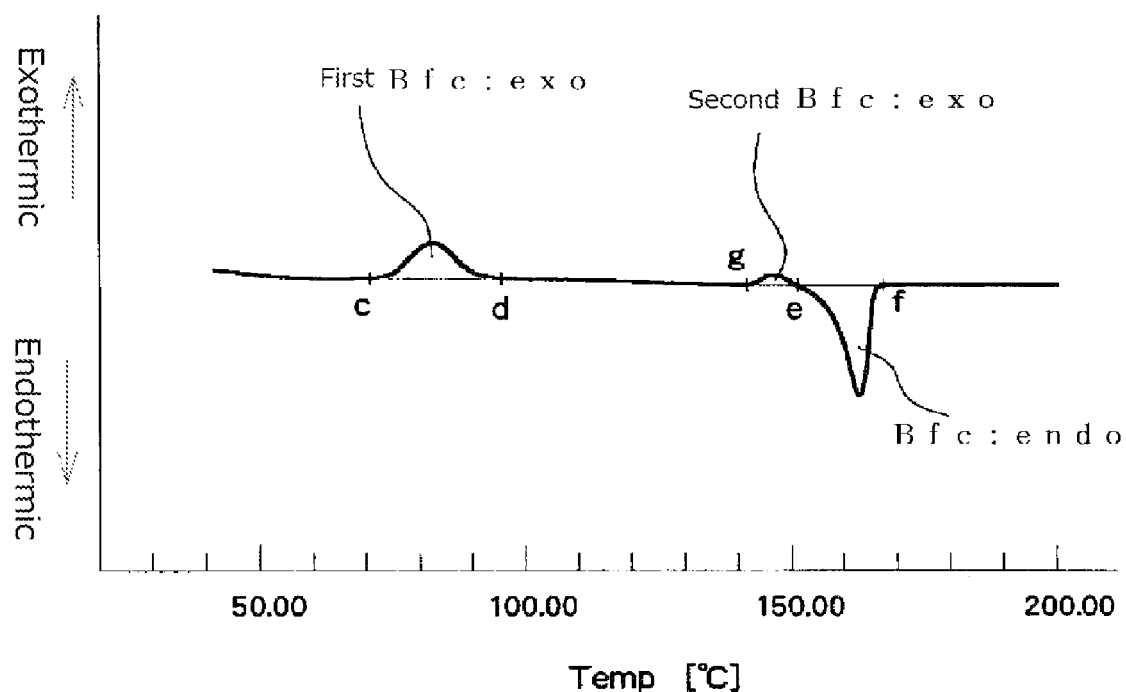
FIG. 7 illustrates an example of a first time DSC curve (II) showing an exothermic calorific value (Bfc:exo) and an endothermic calorific value (Bfc:endo) of a measurement sample as measured with a heat flux differential scanning calorimeter.

As shown in FIG. 7, there is a case in which a small exothermic peak exists on a low temperature side of the endothermic peak. In such a case, the exothermic calorific value (Bfc:exo) is determined from a sum of an area "A" of the first exothermic peak and an area "B" of the second exothermic peak. Namely, when a point where the exothermic peak begins separating from a low temperature-side base line of the first exothermic peak is assigned as point "c" and a point where the first exothermic peak returns to a high temperature-side base line is assigned as point "d", the area "A" is an area defined by a straight line passing the points "c" and "d" and the DSC curve and represents the generated calorific value. On the other hand, when a point where the exothermic peak begins separating from a low temperature-side base line of the second exothermic peak is assigned as point "g" and a point where the endothermic peak returns to a high temperature-side base line is assigned as point "f", and when a point where a straight line passing the points "g" and "f" intersects the DSC curve is assigned as point "e", the area "B" is an area defined by a straight line passing the points "g" and "e" and the DSC curve and represents the generated calorific value. In FIG. 7, the endothermic calorific value (Bfc:endo) is a calorific value determined from the area which is defined by the straight line passing the points "e" and "f" and the DSC curve and which represents the absorbed calorific value.

In the measurement of the exothermic calorific value (Bfc:exo) and the endothermic calorific value (Bfc:endo), a heating speed of 2° C./minute is adopted as a condition of the DSC curve measurement for reasons that such a heating speed of 2° C./minute has been found by the present inventors to be suitable for separating the endothermic and exothermic peaks as clearly as possible from each other and for precisely determining [(Bfc:endo)-(Bfc:exo)] by heat flux differential scanning calorimetry.

The polylactic acid resin expanded bead that meets the above formulas (1), in addition to the formula (2), may be obtained by expanding a multi-layered resin particle having a core layer formed of a polylactic acid resin, and an outer layer covering the core layer and formed of another polylactic acid resin. In this case it is not necessary that the outer layer should entirely cover the core layer. As long as the expanded bead satisfies the formula (1), the resin of which the core layer of the multi-layered resin particle is formed may be exposed on a part of the surface of the obtained expanded bead.

It is preferred that the softening point (B) [° C] of the polylactic acid resin of which the outer layer is formed be lower than the softening point (A) [° C] of the polylactic acid resin of which the core layer is formed and that a difference [(A)-(B)]between the softening point (A) and the softening point (B) be greater than 0° C. and is not greater than 105° C., more preferably from 15 to 105° C., still more preferably from 20 to 105° C. The multi-layered resin particles that show the above specific range of the above difference in softening point may be produced by a method as described hereinafter which includes coextruding polylactic acid resins with softening points (B) and (A) of the outer and core layers. By expanding such multi-layered resin particles, the expanded beads that meet the above formula (1), (2) and (3) may be obtained in an efficient manner. The expanded beads that meet the formula (1), (2) and (3) show excellent fusion bonding property during an in-mold molding stage. It is preferred, from the standpoint of handling efficiency of the expanded beads and mechanical strength at elevated temperatures of the expanded beads molded article, that the softening point of the polylactic acid resin of the outer layer not only meets the above-mentioned relationship with the softening point (A) of the polylactic acid resin of the core layer but also is 50° C. or more, more preferably 55° C. or more, particularly preferably 65° C. or more.

As used herein, the term "softening point" is intended to refer to a Vicat softening point as measured according to JIS K7206 (1999), Method A50. In particular, a polylactic acid resin is sufficiently dried in a vacuum oven and pressed at 200° C. and 20 MPa (if necessary, air evacuation is carried out so as to prevent inclusion of air bubbles) to obtain a test piece with a length of 20 mm, a width of 20 mm and a thickness of 4 mm. The test piece is annealed in an oven at 80° C. for 24 hours and then measured using, for example, HDTA/SPT tester Model TM-4123 manufactured by Ueshima Seisakusho Co., Ltd.

In the multi-layered resin particles each having the core layer and outer layer, it is preferred that the weight ratio of the resin of which the core layer is formed to the resin of which the outer layer is formed be 99.9:0.1 to 80:20, more preferably 99.7:0.3 to 90:10, still more preferably 99.5:0.5 to 92:8. The resin forming the outer layer is desired not to be expanded in the expanding step. The outer layer may be expanded, however. When the weight ratio of the resin of the core layer to the resin of the outer layer of the multi-layered resin particles falls within the above-described range, fusion-bonding strength between the expanded beads obtained by expansion of the multi-layered resin particles becomes high. Therefore, in the first place, the mechanical property of the expanded beads molded article obtained from the expanded beads becomes high. In the second place, the increase of the proportion of the core layer which contributes to an improvement of the properties of the expanded beads further improves the mechanical properties of the expanded beads molded article.

The above-described end capping agent, when added to the polylactic acid resin forming the multi-layered resin particles composed of the core layer and outer layer, is preferably incorporated at least in the core layer, more preferably in each of the core and outer layers. When at least the polylactic acid resin of the core layer, preferably the polylactic acid resin of each of the core and outer layers, is modified with the end capping agent, it is possible to suppress hydrolysis during the course of the preparation of expanded beads, so that expanded beads can be produced in a stable manner. Further, it is also possible to suppress hydrolysis during the course of the preparation of expanded beads molded articles so that such molded articles can be produced in a stable manner. Moreover, when the molded articles are subjected to actual use, they are expected to show improved durability and withstand use under a high temperature and high humidity environment.

In the expanded bead obtained by expanding the above-described multi-layered resin particle, the thickness of that portion of the expanded bead derived from the outer layer of the multi-layered resin particle (hereinafter referred to as "outer layer-derived portion) is desired to be thin, because cells are hard to be formed in the outer layer-derived portion and because mechanical properties of the expanded beads molded article are improved. When the thickness of the outer layer-derived portion is excessively low, there may be apprehension that the effect of improving fusion bonding between expanded beads, which may be achieved by the provision of the surface formed of the outer layer-derived portion of the multi-layered resin particle, is adversely affected. In actual, however, sufficient fusion bonding improving effect is achieved when the thickness is in the range described below. Namely, the outer layer-derived portion of the expanded bead preferably has an average thickness of 0.1 to 20 μm, more preferably 0.2 to 10 μm, particularly preferably 0.3 to 5 μm. The average thickness of the outer layer-derived portion of the expanded bead may be controlled by a control of the weight ratio of a resin of a core layer to a resin of an outer layer of the multi-layered resin particle during the fabrication thereof. The outer layer of the multi-layered resin particle preferably has an average thickness of 2 to 100 μm, more preferably 3 to 70 μm, particularly preferably 5 to 50 μm.

The average thickness of the outer layer-derived portion of the expanded beads is measured as follows. One expanded bead is cut into nearly equal halves. From a photograph of the enlarged cross section, the thickness of the outer layer-derived portion in each of the four positions (upper and lower sides, and left and right sides) thereof is measured. The arithmetic mean of the four thickness values is the thickness of the outer layer-derived portion of the expanded bead. Similar procedures are repeated for a total of 10 expanded beads. The arithmetic mean of the ten thickness values is the average thickness of the outer layer-derived portion of the expanded beads. In the multi-layered expanded beads, when the outer layer-derived portion is formed on parts of the peripheral surface of the core layer, there may arise a case where the thickness of the outer layer cannot be measured in any way at the above four positions. In such a case, the thickness of the outer layer-derived portion is measured at four randomly selected measurable positions and the arithmetic mean thereof is defined as the thickness of the outer layer of the expanded bead. Also, when the thickness of the outer layer-derived portion of the expanded beads is not easily determined, it is preferable to produce the multi-layered expanded beads in such a manner that a suitable colorant is incorporated in the resin of which the outer layer of the multi-layered resin particles is formed. Incidentally, the average thickness of the outer layer of the multi-layered resin particles may be also measured by the above method.

The polylactic acid resin expanded bead of the present invention having the low temperature peak and high temperature peak preferably has an apparent density of 25 to 400 g/L, more preferably 40 to 200 g/L, from the standpoint of excellence in lightness in weight, in-mold moldability, mechanical properties and in-mold moldability.

As used herein, the apparent density of the expanded beads is measured by the following method. The expanded beads are allowed to stand for aging in a constant temperature and humidity room at 23° C. under atmospheric pressure and a relative humidity of 50% for 10 days. In the same room, about 500 mL of the aged expanded beads are weighed to determine their weight W1 (g). The weighed expanded beads are immersed in water at 23° C. contained in a measuring cylinder using a wire net or the like tool. From a rise of the water level volume, the volume V1 (L) of the expanded beads placed in the measuring cylinder is determined by subtracting the volume of the wire net and the like tool placed therein. The apparent density is calculated by dividing the weight W1 of the expanded beads placed in the measuring cylinder by the volume V1 (W1/V1).

The polylactic acid resin expanded beads of the present invention preferably have an average cell diameter of 30 to 500 μm, more preferably 50 to 250 μm, from the standpoint of their in-mold moldability and improved appearance of the expanded beads molded article obtained therefrom.

The average cell diameter of the expanded beads is measured as follows. One expanded bead is cut into nearly equal halves. From an enlarged image of the cross section taken by a microscope, the average cell diameter is determined as follows. On the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. The number of the cells ($n1$ to $n4$) that intersect each of the four lines is counted. The total number ($N=n1+n2+n3+n4$) of the cells that intersect the above four line segments is counted. Also measured is a total length ($L$ (μm)) of the four line segments. The value ($L/N$) obtained by dividing the total length $L$ by the total number $N$ is an average cell diameter of the one expanded bead. Similar procedures are repeated for 10 expanded beads in total. The arithmetic mean of the average cell diameters of the ten expanded beads represents the average cell diameter of the expanded beads.

The expanded bead of the present invention preferably has a closed cell content of 80% or more, more preferably 85% or more, still more preferably 90% or more. When the closed cell content is excessively small, the expanded bead tends to deteriorate in its secondary expansion property and to give an expanded beads molded article having reduced mechanical properties. In the present invention, it is preferred that the polylactic acid resin that constitutes the base resin of the expanded beads be capped at is molecular chain ends as described previously, for reasons that the closed cell content of the expanded bead becomes high.

As used herein, the closed cell content of the expanded bead is measured as follows. The expanded beads are allowed to stand for aging in a constant temperature and humidity room at 23° C. under atmospheric pressure and a relative humidity of 50% for 10 days. In the same room, about 20 $cm^3$ bulk volume of the expanded beads thus aged are sampled and measured for the precise apparent volume $Va$ by a water immersion method. The sample whose apparent volume $Va$ has been measured is fully dried and measured for its true volume $Vx$ according to Procedure C of ASTM D-2856-70 using Air Comparison Pycnometer Type-930 manufactured by Toshiba Beckman Inc. From the volumes $Va$ and $Vx$, the closed cell content is calculated by the formula (4). The average (N=5) is the closed cell content of the expanded bead.

Closed cell content (%)=$(Vx-W/\rho) \times 100/(Va-W/\rho)$ (4)

wherin $Vx$ represents the true volume (cm$^3$) of the expanded beads measured by the above method, which corresponds to a sum of a volume of the resin constituting the expanded beads and a total volume of all the closed cells in the expanded beads, $Va$ represents an apparent volume (cm$^3$) of the expanded beads, which is measured by a rise of the water level when the expanded beads are immersed in water contained in a measuring cylinder, $W$ is a weight (g) of the sample expanded beads used for the measurement; and $\rho$ is a density (g/cm$^3$) of the resin constituting the expanded beads.

The expanded beads of the present invention give, upon being subjected to in-mold molding, a polylactic acid resin expanded beads molded article. The shape of the expanded beads is not specifically limited. Not only molded articles with a plate-like, columnar, vessel-like or block-like form but also articles with a complicated three-dimensional shape, in particular thick articles may be produced.

The expanded beads molded articles of the present invention, which are produced from the expanded beads having a high temperature peak, show excellent fusion bonding between the expanded beads and appreciable improvement in dimensional stability and mechanical strength. Therefore, the molded article exhibits properties attributed to the base resin and properties attributed to the expansion. Further, the expanded beads molded article which has been heat treated (heat set) for sufficiently increasing the degree of crystallization not only has the above effect of improving the above properties but also shows more excellent mechanical strength.

The expanded beads molded article of the present invention preferably has a bulk density of 15 to 300 g/L, more preferably 25 to 180 g/L, for reasons of lightness in weight and excellence in mechanical properties.

The expanded beads molded article preferably has a closed cell content of 60% or more, more preferably 70% or more, still more preferably 80% or more. When the closed cell content is excessively low, there is a possibility that the mechanical properties such as compressive strength of the expanded beads molded article is deteriorated.

The closed cell content of the expanded beads molded article may be determined in the same manner as that for the measurement of the closed cell content of the expanded beads except that a rectangular parallelepiped measurement sample with a size of 25 mm in length, 25 in width and 30 mm in thickness is cut out from a center part of the expanded beads molded article (skin should be completely cut off).

The expanded beads molded article shows excellent fusion bonding between the expanded beads. The degree of fusion bonding is preferably 50% or more, more preferably 60% or more, particularly preferably 80% or more. The expanded beads molded article having a high degree of fusion bonding excels in mechanical properties, particularly in bending strength.

A method for preparing the polylactic acid resin expanded beads of the present invention will be next described. As the preferred method for preparing the expanded beads of the present invention, there may be mentioned a dispersing medium release foaming method. By adopting the dispersing medium release foaming method, it is easy to control the formation of the high temperature peak and the calorific value of the high temperature peak. As the method for preparing the polylactic acid resin expanded beads, there may be adopted other preparation methods such as an impregnation expansion method and an extrusion foaming method, as long as such other methods can produce expanded beads that meet the requirements of the present invention.

The dispersing medium release foaming method is a method including melting and kneading a polylactic acid resin in an extruder, extruding the kneaded resin in the form of strands, cutting the extrudate to obtain resin particles, dispersing the resin particles in an aqueous dispersing medium contained in a pressure resistant closed vessel, impregnating a physical blowing agent into the resin particles, while heating them, to obtain foamable resin particles, and releasing the foamable resin particles together with the aqueous dispersing medium, at an adequate expanding temperature, from the pressure resisting vessel to obtain expanded beads. In this method, while a resin particle preparation step, a blowing agent impregnation step and a foaming step may be performed separately, the blowing agent impregnation step and the foaming step are generally carried out in a single stage.

In the resin particle preparation step, resin particles may be prepared by extruding a base resin into which required additives have been incorporated, the extrudate being then pelletized, for example, a strand cutting method or an under-water cutting method. When the above formula (1) should be met in the present invention, it is preferable to produce resin particles each composed of a core layer and an outer layer. Such resin particles each composed of a core and an outer layer may be produced using a coextrusion molding technique disclosed in, for example, Japanese Kokoku Publications Nos. JP-B-S41-16125. JP-B-S43-23858 and JP-B-S44-29522 and Japanese Kokai Publication No. JP-A-S60-185816.

When resin particles each composed of a core layer and an outer layer are to be prepared by coextrusion, a device in which an extruder for forming a core layer and an extruder for forming an outer layer are connected to a coextrusion die may be used. A polylactic acid resin and, if needed, additives are fed to the extruder for forming a core layer and melted and kneaded, while another polylactic acid resin and, if needed, additives are fed to the extruder for forming an outer layer and melted and kneaded. The respective molten kneaded masses thus obtained are combined in the die and extruded in the form of strands through small holes of a mouthpiece attached to a die exit at a tip of the extruder. Each of the strands has a multi-layer structure having a columnar core layer and an annular outer layer covering the core layer. The extruded strands are cooled by being immersed in water and then cut with a pelletizer such that the resin particles obtained each have a specific weight, whereby resin particles having a multi-layer structure are obtained. Alternatively, such resin particles may be obtained by cutting the extruded strands having a multi-layer structure into resin particles each have a specific weight, the resin particles being cooled after or simultaneous with the cutting.

The resin particles preferably have an average weight per one particle of 0.05 to 10 mg, more preferably 0.1 to 4 mg. When the average weight is excessively small, a special production method should be adopted. When the average weight is excessively large, on the other hand, there is a possibility that the expanded beads obtained therefrom have a broad density distribution and cannot be filled in a mold cavity in an efficient manner at the time of molding. The shape of the resin particles may be, for example, a cylindrical column, a sphere, a rectangular column, an oval or a cylinder. Expanded beads obtained by foaming and expanding the resin particles have a shape that is similar to that of the resin particles before expansion.

When the resin particles are produced by melting and kneading the base resin with an extruder, followed by extrusion into strands, it is preferable to dry the polylactic acid resin, which is a constituent of the base resin, before kneading for reasons of prevention of degradation of the polylactic acid resin by hydrolysis. In order to suppress degradation of the polylactic acid resin by hydrolysis, a method using an extruder provided with a vent hole may also be adopted so that moisture is removed from the polylactic acid resin by evacuation through the vent hole. The removal of moisture from the polylactic acid resin may permit the prevention of the generation of air bubbles in the resin particles and may improve the stability of the extrusion procedures.

Description will be next made of the blowing agent impregnation step and expansion step of the dispersing medium release foaming method. In one embodiment of the dispersing medium release foaming method, the resin particles are impregnated with a physical blowing agent to form expandable resin particles, for example, by heating, in a pressure resistant vessel, the expanded beads dispersed in a dispersing medium together with a physical blowing agent, or by first dispersing and heating the resin particles in a dispersing medium in a pressure resistant vessel, a blowing agent being subsequently injected into the pressure resistant vessel. The obtained foamable resin particles are then released together with the dispersing medium into a zone having a pressure lower than that in the pressure resistant vessel so that the foamable resin particles are allowed to foam and expand to obtain the expanded beads.

A foaming aid may be previously incorporated into the resin particles for the purpose of controlling the apparent density and cell diameter of the obtained expanded beads. Examples of the foaming aid include an inorganic powder such as talc, calcium carbonate, borax, zinc borate, aluminum hydroxide and silica, and a polymer such as polytetrafluoroethylene, polyethylene wax, polycarbonate, polyethylene terephthalate, polypropylene terephthalate, polybutylene terephthalate, polycylohexanedimethylene terephthalate, polyethylene naphthalate, polybutylene naphthalate, silicone, methyl methacrylate copolymer and crosslinked polystyrene. Among the above foaming aids, polytetrafluoroethylene, polyethylene wax and crosslinked polystyrene are preferred for the purpose of the present invention. Particularly preferred is hydrophobic polytetrafluoroethylene powder.

In corporation of the foaming aid into the base resin, the foaming aid may be kneaded as such together with the base resin. For reasons improved dispersibility, however, it is preferred that the foaming aid be formed into a master batch and the master batch be kneaded with the base resin.

Since the apparent density and cell diameter of the expanded beads according to the present invention vary depending upon the blending amount of the foaming aid, it is expected that the foaming aid has an effect of controlling the properties. The amount of the foaming aid is generally 0.001 to 5 parts by weigh, preferably 0.005 to 3 parts by weight, more preferably 0.01 to 2 parts by weight, per 100 parts by weight of the base resin.

Because a polylactic acid resin is easily hydrolyzed, an additive to be blended with the base resin is desired to be selected from hydrophobic substances while avoiding the use of a hydrophilic substance as much as possible. Thus, when a hydrophobic foaming aid is used, it is possible to obtain an effect as a foaming aid while preventing degradation of the polylactic acid resin due to hydrolysis. In particular, it is possible to reduce the apparent density (improvement of expansion ratio) and to uniformize the cell diameter while sufficiently preventing hydrolysis of the polylactic acid resin.

The high temperature peak of the expanded beads of the present invention develops when resin particles are heat treated, at a temperature range in which crystals thereof are not completely melted, during the course of or after completion of impregnation of the resin particles with a blowing agent that is carried out in a pressure resisting vessel with heating. The heat treatment is carried out by holding the resin particles at a specific temperature and for a specific period of time as described below. The temperature at which the high temperature peak is allowed to develop is generally in the range from [melting point minus 30° C] to [melting point minus 10° C] where the melting point is that of the base resin of which the resin particles are formed, although the temperature varies depending upon the kind of the blowing agent and the aimed apparent density of the expanded beads. The heat treatment time is generally 5 to 60 minutes, preferably 5 to 15 minutes. Too long a heat treatment time may cause hydrolysis of the polylactic acid resin. Thus, the resin particles are preferably held at the above temperature range for at least 5 minutes for forming expanded beads that show the high temperature peak.

As described above, in the dispersing medium release foaming method, resin particles are dispersed in a dispersing medium, such as, water in a pressure resistant closed vessel, such as an autoclave, to which a blowing agent is fed under a pressure in a predetermined amount. The dispersion is then stirred at an elevated temperature for a predetermined time to impregnate the blowing agent into the polylactic acid resin particles. The contents in the vessel are discharged utilizing the pressure inside the vessel into a lower pressure zone to foam and expand the resin particles and to obtain the expanded beads. At the time of the discharge, it is preferred that the contents are released while applying a back pressure to a space in the vessel. When particularly low apparent density (high expansion ratio) expanded beads are to be produced, the following treatment is carried out. Thus, after the expanded beads obtained by the above method have been subjected to an aging step under atmospheric pressure, as is customarily done, they are charged in a pressure resistant closed vessel again and is subjected to a pressurizing treatment using a pressurized gas such as air at 0.01 to 0.10 MPa(G) so that the internal pressure of the expanded beads is increased. The resulting expanded beads are heated with a heating medium such as hot air, steam or a mixture of air and steam in an pre-expansion vessel thereby to obtain expanded beads having a further lower apparent density.

As the dispersing medium in which the resin particles are dispersed, water is preferred. However, other than water, a dispersing medium that does not dissolve the polylactic acid resin particles may be used.

A dispersing agent or a dispersing aid may be added to the dispersing medium, if necessary, in dispersing the resin particles in the dispersing medium. Examples of the dispersing agent include inorganic substances such as aluminum oxide, tribasic calcium phosphate, magnesium pyrophosphate, titanium oxide, zinc oxide, basic magnesium carbonate, basic zinc carbonate, calcium carbonate, kaolin, mica and clay; and water soluble polymer protective colloid agents such as polyvinylpyrrolidone, polyvinyl alcohol and methyl cellulose. The dispersing medium may also be incorporated with a dispersing aid such as an anionic surfactant, e.g. sodium dodecylbenzenesulonate and sodium alkanesulfonate.

The dispersing agent may be used in an amount of 0.05 to 3 parts by weight per 100 parts by weight of the resin particles, while the dispersing aid may be used in an amount of 0.001 to 0.3 part by weight per 100 parts by weight of the resin particles.

As the blowing agent, there may be used, for example, organic physical blowing agents such as hydrocarbons (e.g. butane, pentane and hexane), and halogenated hydrocarbons (e.g. 1,1-difluoroethane, 1,1,1,2-tetrafluoroethane, 1,3,3,3-tetrafluoropropene and dichloromethane) and inorganic physical blowing agents such as inorganic gas (e.g. carbon dioxide, nitrogen and air) and water. These physical blowing agents may be used singly or in combination of two or more thereof. Among physical blowing agents, those which are composed mainly of an inorganic physical blowing agent such as carbon dioxide, nitrogen and air are preferably used. Carbon dioxide is particularly preferred. The term "physical blowing agent composed mainly of an inorganic physical blowing agent" as used herein is intended to refer to a physical blowing agent which contains at least 50% by mole, preferably at least 70% by mole, still more preferably at least 90% by mole, of an inorganic physical blowing agent in 100% by mole of the total physical blowing agent.

The amount of the physical blowing agent is determined as appropriate in consideration of the kind of the blowing agent, amount of the additives, the apparent density of the desired expanded beads, etc. For example, the inorganic physical blowing agent is used in an amount of about 0.1 to 30 parts by weight, preferably 0.5 to 15 parts by weight, more preferably 1 to 10 parts by weight, per 100 parts by weight of the based resin.

Description will next be made of a method for producing an expanded beads molded article from the expanded beads of the present invention. For the preparation of an expanded beads molded article, any known in-mold molding method may be adopted. In the present invention, an expanded beads molded article may be easily obtained by molding the expanded beads having a low temperature peak and a high temperature peak in a mold cavity in any known method. Examples of such a method include a compression molding method, a cracking molding method, a pressure molding method, a compression filling molding method and an ambient pressure filling molding method, in each of which a conventional mold for expanded beads is used (see, for example, Japanese Kokoku Publications No. JP-B-S46-38359, No. JP-B-S51-22951, No. JP-B-H04-46217, No. JP-B-H06-22919 and No. JP-B-H06-49795).

As the generally preferably adopted in-mold molding method, there may be mentioned a batch-type in-mold molding method in which expanded beads are filled in a mold cavity of a conventional mold for thermoplastic resin expanded beads adapted to be heated and cooled and to be opened and closed. Steam having a saturation vapor pressure of 0.01 to 0.25 MPa(G), preferably 0.01 to 0.20 MPa(G), is then fed to the mold cavity to heat, foam and fuse bond the beads together. The obtained expanded beads molded article is then cooled and taken out of the mold cavity.

The feed of the steam may be carried out by a conventional method such as a combination of one-direction flow heating, reversed one-direction flow heating and both-direction flow heating. The particularly preferred heating method includes preheating, one-direction flow heating, reversed one-direction flow heating and both-direction flow heating which are successively performed in this order.

The expanded beads molded article may be also produced by a continuous in-mold molding method in which the expanded beads are fed to a mold space which is defined between a pair of vertically spaced, continuously running belts disposed in a path. During the passage through a steam-heating zone, saturated steam with a saturation vapor pressure of 0.01 to 0.25 MPa(G) is fed to the mold space so that the expanded beads are foamed and fuse bonded together. The resulting molded article is cooled during its passage through a cooling zone, discharged from the path and successively cut into a desired length (see, for example, Japanese Kokai Publications No. JP-A-H09-104026, No. JP-A-H09-104027 and No. JP-A-H10-180888).

Prior to the above in-mold molding, the expanded beads obtained by the above-described method may be charged in a pressure resistant closed vessel and treated with a pressurized gas such as air to increase the pressure inside the cells thereof to 0.01 to 0.15 MPa(G). The treated beads, whose in-mold moldability has been further improved, are taken out of the closed vessel and then subjected to in-mold molding. The treated expanded beads exhibit further improved in-mold moldability.

EXAMPLES

The following examples will further illustrate the present invention.

Examples 1 to 6 and Comparative Examples 1 and 2

An extrusion device having an extruder (inside diameter: 65 mm) for forming a core layer, an extruder (inside diameter: 30 mm) for forming an outer layer and a coextrusion die for forming multi-layered strands which was attached to exits of the two extruders was used. The polylactic acid resins shown in Table 1 for forming a core layer and an outer layer were fed to respective extruders and melted and kneaded. The molten kneaded masses were introduced into the coextrusion die and combined in the die and extruded in the form of strands through small holes of a mouthpiece attached to a die exit. Each of the strands had a multi-layer structure having a core layer and an annular outer layer covering the core layer with a weight ratio shown in Table 1. The extruded strands were cooled in a water tank and then cut with a pelletizer into particles each having a weight about 2 mg. Drying of the cut particles gave multi-layered resin particles.

Meanwhile, a cell controlling agent master batch was also fed to the extruder for forming the core layer together with the polylactic acid resin so that the polylactic acid resin of the core layer contained polytetrafluoroethylene powder (Trade name: TFW-1000, manufactured by Seishin Enterprise Co., Ld.) as the cell controlling agent in an amount of 1,000 ppm by weight.

Using the obtained resin particles, polylactic acid resin expanded beads were prepared. Thus, 1 kg of the obtained resin particles were charged in a 5 L closed vessel together with 3 L of water as a dispersing medium, to which 0.1 part by weight of an aluminum oxide as a dispersing agent and 0.01 part by weight (effective amount) of a surfactant (sodium alkylbenzenesulfonate, Trade name: Neogen S-20F, manufactured by Dai-ichi Kogyou Seiyaku Co., Ltd.) were added. The contents were then heated with stirring to a temperature lower by 5° C. than the foaming temperature shown in Table 1. Carbon dioxide as a blowing agent was then injected into the closed vessel until a pressure lower by 0.2 MPa(G) than the pressure shown in Table 1 was reached. After having been allowed to stand at that temperature for 15 minutes, the contents in the vessel were heated to the foaming temperature and carbon dioxide was injected until the pressure shown in Table 1 was reached. After having been maintained at the foaming temperature for 15 minutes, the contents were released to atmospheric pressure while applying back pressure with carbon dioxide to obtain polylactic acid resin expanded beads having an apparent density as shown in Table 1. Incidentally, the amount (part by weight) of the dispersing agent and surfactant is per 100 parts by weight of the polylactic acid resin particles.

The conditions (inside pressure of the closed vessel and foaming temperature) under which the polylactic acid resin expanded beads were prepared are shown in Table 1. Various physical properties of the obtained expanded beads such as endothermic calorific value of the high temperature peak, apparent density, closed cell content and average cell diameter, are also shown in Table 1.

Example 7

An extrusion device having an extruder with an inside diameter of 65 mm and a die for forming strands which was attached to an exit of the extruder was used. The polylactic acid resins shown in Table 1 was fed to the extruder where it was melted and kneaded. The molten kneaded mass was introduced into the die attached to the tip of the extruder and extruded in the form of strands through small holes of a mouthpiece attached to the die. In the same manner as that in Example 1, the extruded strands were cooled with water and then cut with a pelletizer into particles each having a weight about 2 mg. Drying of the cut particles gave resin particles from which polylactic acid resin expanded beads were prepared in the same manner as that in Example 1.

Meanwhile, a cell controlling agent master batch was also fed to the extruder together with the polylactic acid resin so that the polylactic acid resin contained polytetrafluoroethylene powder (Trade name: TFW-1000, manufactured by Seishin Enterprise Co., Ld.) as the cell controlling agent in an amount of 1,000 ppm by weight.

The conditions (autoclave inside pressure and expansion temperature) under which the polylactic acid resin expanded beads were prepared are shown in Table 1. The results of measurements of various physical properties of the obtained expanded beads are also shown in Table 1.

TABLE 1

| | | | Example | | | | | | | Comparative Example | |
|---|---|---|---|---|---|---|---|---|---|---|---|
| | | | 1 | 2 | 3 | 4 | 5 | 6 | 7 | 1 | 2 |
| Resin particles | Core layer | Composition | *1) | *1) | *1) | *1) | *1) | *1) | *1) | *1) | *1) |
| | | Melting point (A) (° C.) | 157 | 157 | 157 | 157 | 157 | 157 | 157 | 157 | 157 |
| | Outer layer | Composition | *2) | *1)/*2) = 20/80 | *2) | *2) | *2) | *2) | — | *1)/*2) = 20/80 | *2) |
| | | Melting point (B) (° C.) | 58 | 125 | 58 | 58 | 58 | 58 | — | 125 | 58 |
| | | [(A) − (B)] (° C.) | 99 | 32 | 99 | 99 | 99 | 99 | — | 32 | 99 |
| | | Core layer/Outer layer (weight ratio) | 90/10 | 90/10 | 90/10 | 95/5 | 90/10 | 90/10 | — | 90/10 | 90/10 |
| Expanded beads | | Blowing agent | CO2 | CO2 | CO2 | CO2 | CO2 | CO2 | CO2 | CO2 | CO2 |
| | | Autoclave inside pressure (MPa(G)) | 3.0 | 3.0 | 3.0 | 3.0 | 3.0 | 3.2 | 3.0 | 3.0 | 3.5 |
| | | Expansion temperature (° C.) | 144.0 | 144.0 | 144.5 | 143.5 | 143.0 | 142.5 | 144.0 | 145.0 | 142.0 |
| | | Apparent density (g/L) | 80 | 80 | 80 | 80 | 80 | 80 | 80 | 80 | 80 |
| | | Number of high temperature peak *3 | 1 | 1 | 1 | 1 | 1 | 1 | 1 | 0 | 1 |
| | | Number of low temperature peak *4 | 1 | 1 | 1 | 1 | 1 | 1 | 1 | 1 | 1 |
| | | High temperature peak temperature (° C.) | 173 | 173 | 173 | 173 | 173 | 174 | 173 | No peak | 173 |
| | | Low temperature peak temperature (° C.) | 164 | 164 | 164 | 164 | 164 | 164 | 164 | 164 | 164 |
| | | Endothermic peak temperature *5 (° C.) | 167 | 167 | 167 | 167 | 167 | 167 | 167 | 167 | 167 |
| | | High temp. peak calorific value *6 (J/g) | 4 | 5 | 1 | 6 | 11 | 14 | 3 | No peak | 17 |
| | | Brc: endo(J/g) *7 | 38 | 38 | 39 | 39 | 39 | 38 | 38 | 38 | 38 |
| | | Brs: endo(J/g) *8 | 33 | 32 | 32 | 33 | 32 | 31 | 37 | 33 | 33 |
| | | Br: endo(J/g) *9 | 40 | 39 | 37 | 39 | 38 | 38 | 38 | 39 | 38 |
| | | Bfc: exo(J/g) *10 | 13 | 5 | 14 | 4 | 6 | 9 | 20 | 19 | 8 |
| | | Bfc: endo(J/g) *11 | 40 | 39 | 38 | 41 | 41 | 42 | 39 | 40 | 42 |
| | | Bfc: endo − Bfc: exo (J/g) | 28 | 34 | 25 | 36 | 35 | 33 | 20 | 21 | 34 |
| | | Closed cell content (%) | 93 | 93 | 91 | 92 | 93 | 93 | 92 | 93 | 92 |
| | | Average cell diameter (μm) | 60 | 54 | 111 | 50 | 56 | 34 | 72 | 145 | 82 |

Remarks in Table 1
*1): Crystalline PLA: TERRAMAC TP-4000E, manufactured by Unitika Ltd. (modified with a carbodiimide compound, melting point: 168° C., MFR (190° C./2.16 kgf): 4.6 g/10 min)
*2): Non-crystalline PLA: TERRAMAC TP-4001E, manufactured by Unitika Ltd. (modified with a carbodiimide compound, melting point: not determined, MFR (190° C./2.16 kgf): 6.0 g/10 min)
*3: Number of high temperature peaks in the first time DSC curve (I)
*4: Number of low temperature peaks in the first time DSC curve (I)
*5: Peak temperature of the endothermic peak on the highest temperature side of the second time DSC curve (I)
*6: Endothermic calorific value of the high temperature peak of the expanded bead
*7: Endothermic calorific value Brc: endo of the core region of the expanded bead determined by the second time DSC curve (II)
*8: Endothermic calorific value Brs: endo of the surface region of the expanded bead determined by the second time DSC curve (II)
*9: Endothermic calorific value Br: endo of the entire expanded bead determined by the second time DSC curve (II)
*10: Exothermic calorific value Bfc: exo of the core region of the expanded bead determined by the first time DSC curve (II)
*11: Endothermic calorific value Bfc: endo of the core region of the expanded bead determined by the first time DSC curve (II)

In Table 1, the various physical properties such as endothermic calorific value of the high temperature peak, apparent density, closed cell content and average cell diameter, were as measured by the methods described previously.

Next, using the obtained expanded beads, expanded beads molded articles were prepared. Use was made of an ordinary molding device having a mold for forming a flat plank having a length of 200 mm, a width of 250 mm and a thickness of 70 mm. The expanded beads obtained in each of the above Examples and Comparative Examples were subjected to a pressurizing treatment to impart the internal pressure shown in Table 2. The expanded beads having the increased internal pressure were placed in a cavity of the flat plank mold and subjected to an in-mold molding process by steam heating to obtain expanded beads molded articles each in the form of a plank. The heating with steam was performed as follows. Steam was fed for 5 seconds for preheating in such a state that drain valves of the stationary and moveable molds were maintained in an open state. Next, while maintaining the drain valve on the stationary mold in an open state, steam was fed from the moveable mold for 5 seconds. Then, while maintaining the drain valve on the moveable mold in an open state, steam was fed from the stationary mold for 10 seconds. Thereafter, while maintaining the drain valves of the stationary and moveable molds in a closed state, steam was fed from both sides of the molds until the pressure in the mold cavity reached the molding vapor pressure shown in Table 2 to heat the expanded beads.

After completion of the heating, the pressure was released and cooling with water was carried out until the pressure of a surface pressure gauge within the mold cavity was reduced to 0.02 MPa(G). The molds were then opened and the molded body was taken out therefrom. The molded body was aged in an oven at 40° C. for 15 hours, then aged in an oven at 70° C. for another 15 hours, and thereafter allowed to gradually cool to room temperature to obtain an expanded beads molded article.

Each of the thus prepared expanded beads molded articles were evaluated for their various physical properties such as appearance, 50% compression stress, degree of fusion bonding and shrinkage. The results are summarized in Table 2.

The expanded bead internal pressure and the bulk density of the molded articles shown in Table 2 are measured by the following methods: Expanded bead internal pressure:

The internal pressure of the expanded beads that were used for the preparation of the expanded beads molded article was determined using a part of the expanded beads (hereinafter referred to as a group of expanded beads) just before feeding to the in-mold molding device as follows.

A group of expanded beads whose internal pressure had been increased in a pressurization tank and which were just before feeding to the in-mold molding device were packed, within 60 seconds after they were taken out of the pressurization tank, in a bag which was provided with a multiplicity of pin holes each having a size preventing the passage of the beads but allowing free passage of air. The beads-containing bag was transferred to a constant temperature and humidity room maintained at 23° C. and 50% relative humidity under ambient pressure. The beads-containing bag was placed on a weighing device in the room and weighed. The weight measurement was carried out 120 seconds after the expanded beads had been taken out of the pressure tank. The measured weight was Q (g). The beads-containing bag was then allowed to stand for 10 days in the same room. The pressurized air in the expanded beads gradually permeated through the cell walls and escaped from the beads. Therefore, the weight of the beads decreased with the lapse of time. However, an equilibrium had been established and the weight had been stabilized after lapse of the 10 days period. Thus, the weight of the bag containing the expanded beads U (g) was measured again in the same room after the lapse of the 10 days period to give a value of U (g). The difference between Q (g) and U (g) was an amount of air increased W (g), from which the internal pressure P (MPa) of the expanded beads was calculated according to the formula (5) shown below. The internal pressure P is converted to a gauge pressure.

$$P = (W/M) \times R \times t/V \quad (5)$$

In the above formula, M is the molecular weight of air (here, a constant of 28.8 (g/mol) is used), R is the gas constant (here a constant of 0.0083 (MPaL/(Kmol) is used), T represents an absolute temperature (and is 296K because 23° C. is used), and V represents a volume (L) obtained by subtracting the

TABLE 2

| | | Example | | | | | | | Comparative Example | |
|---|---|---|---|---|---|---|---|---|---|---|
| | | 1 | 2 | 3 | 4 | 5 | 6 | 7 | 1 | 2 |
| Molding conditions | Expanded bead internal pressure (MPa(G)) | 0.05 | 0.05 | 0.05 | 0.05 | 0.10 | 0.15 | 0.05 | 0.05 | 0.15 |
| | Molding vapor pressure (MPa(G)) | 0.08 | 0.16 | 0.20 | 0.16 | 0.20 | 0.22 | 0.24 | 0.22 | 0.24 |
| Expanded beads molded article | Bulk density of molded article (g/L) | 60 | 60 | 60 | 60 | 60 | 60 | 60 | 60 | 60 |
| | Degree of shrinkage (%) | 1.2 | 1.6 | 1.4 | 1.6 | 1.6 | 1.8 | 1.6 | 1.6 | 1.8 |
| | Degree of fusion bonding (%) Surface region of molded article | 100 | 90 | 100 | 90 | 90 | 90 | 60 | 80 | 40 |
| | Inside region of molded article | 90 | 80 | 60 | 100 | 80 | 80 | 50 | 20 | 40 |
| | Appearance | good | good | good | good | good | fair | good | good | poor |
| | 50% Compression stress (MPa) | 0.62 | 0.65 | 0.51 | 0.64 | 0.64 | 0.62 | 0.53 | 0.48 | 0.57 |
| | Dimension change upon heating (%) | −0.3 | −0.1 | 0.0 | −0.3 | −0.3 | −0.4 | −0.2 | −0.3 | not measured | volume of the base resin of the group of the beads from the apparent volume of the group of the expanded beads.

The apparent volume Y (cm$^3$) of the group of the expanded beads is measured by immersing the entire expanded beads, which have been taken out of the bag after the lapse of the 10 days period, in 100 cm$^3$ of water at 23° C. contained in a measuring cylinder in the same room. From the rise of the water level, the volume Y (cm$^3$) is determined. This volume is converted to a volume in terms of (L). The volume (L) of the base resin in the group of the expanded beads is obtained by dividing the weight of the group of the expanded beads (the difference between U (g) and the weight Z (g) of the bag having a multiplicity of pin holes) by the density (g/cm$^3$) of the resin obtained by defoaming the expanded beads using a heat press, followed by unit conversion. In the above measurement, a plural numbers of the expanded beads are used so that the weight of the group of the expanded beads (difference between U (g) and Z (g)) is within the range of 0.5000 to 10.0000 g and the volume Y is within the range of 50 to 90 cm.

In the present specification, the internal pressure of expanded beads which are to be subjected to two stage expansion is also measured in the same manner as described above.

Bulk Density of Molded Article:

The bulk density of the expanded beads molded article was measured as follows. The expanded beads molded article was allowed to stand at a temperature of 23° C. under a relative humidity of 50% for 24 hours and measured for its outer dimension to determine the bulk volume thereof. The expanded beads molded article was then weighed precisely. The weight (g) of the expanded beads molded article was divided by the bulk volume and the unit was converted to determine the bulk density (g/L) thereof.

The appearance, degree of shrinkage and fusion bonding, 50% compression stress and dimension change upon heating of the expanded beads molded articles shown in Table 2 are evaluated as follows.

Appearance:

Appearance was evaluated by observation of the surface of an expanded beads molded article with naked eyes and rated as follows:

Good: Almost no spaces between beads are observed in the surface of the expanded beads molded article and the surface state is good.

Fair: Spaces between beads are observed, although not significantly, in the surface of the expanded beads molded article.

Poor: Spaces between beads are significantly observed in the surface of the expanded beads molded article.

Degree of Shrinkage:

Change in dimension in the widthwise direction of the expanded beads molded article after aging relative to the dimension of the mold used for molding the flat plank is calculated by the following formula:

Degree of shrinkage (%)=(1−(minimum dimension (mm) in the widthwise direction of the expanded beads molded article after aging)/250 (mm))×100

Degree of Fusion Bonding:

A degree of fusion bonding is evaluated in terms of a proportion (fusion bonding degree) of the number of expanded beads that underwent material failure based on the number of expanded beads that were exposed on a ruptured cross section obtained by rupturing an expanded beads molded article. More specifically, a test piece having a length of 50 mm, a width of 50 mm and a thickness of 20 mm was cut out from each of a surface region and an inside region of the expanded beads molded article. A cut with a depth of 5 mm was formed on each test piece with a cutter knife. Each test piece was then ruptured along the cut line. The ruptured cross section was observed to count a number (n) of the expanded beads present on the surface and a number (b) of the expanded beads which underwent material failure. The percentage of (b) based on (n) represents the fusion bonding degree (%).

50% Compression Stress:

A test piece (without skin) having a length of 50 mm, a width of 50 mm and a thickness of 25 mm was cut out from an expanded beads molded article and was subjected to a compression test in which the test piece was compressed in the thickness direction at a compression rate of 10 mm/min according to JIS K6767(1999) to determine 50% compression stress of the expanded beads molded article.

Dimension Change Upon Heating:

The expanded beads molded articles were each evaluated for their heat resistance in terms of dimension change upon heating. In accordance with JIS K6767 (1976), "thermal stability (Dimensional Stability at High Temperatures", method B)", a test piece was heated for 22 hours in a gear oven maintained at 120° C. Thereafter, the test piece was taken out of the oven and allowed to stand for 1 hour in a constant temperature and humidity room maintained at 23° C. and 50 % relative humidity. From the dimensions before and after the heating, a change in dimension upon heating is calculated according to the following formula:

Dimension change upon heating (%)=(([Dimension after heating]−[Dimension before heating])/[Dimension before heating])×100

The invention claimed is:

1. A polylactic acid resin expanded bead, comprising such a crystal structure that gives a first time DSC curve when 1 to 4 mg of a measurement specimen sampled from the expanded bead are heated, for melting, according to a heat flux differential scanning calorimetry referenced in JIS K7122(1987), from 23° C. to a temperature higher by 30° C. than a fusion peak ending temperature at a heating speed of 10° C./min, and a second time DSC curve when the measurement specimen is then maintained for 10 minutes at the temperature higher by 30° C. than the fusion peak ending temperature, then cooled to 40° C. at a cooling speed of 10° C./min and then again heated, for melting, to a temperature higher by 30° C. than a second fusion peak ending temperature at a heating speed of 10° C./min, said second time DSC curve having a fusion peak having a reference peak temperature, said first time DSC curve having a first at least one fusion peak with a peak temperature higher than the reference peak temperature and a second at least one fusion peak with a peak temperature lower than or equal to the reference peak temperature.

2. The polylactic acid resin expanded bead according to claim 1, wherein said first at least one fusion peak with the peak temperature higher than the reference peak temperature has a total endothermic calorific value of 1 to 15 J/g.

3. The polylactic acid resin expanded bead according to claim 1, wherein an endothermic calorific value (Brc:endo) [J/g] of a surface region of the expanded bead and an endothermic calorific value (Brc:endo) [J/g] of a center region of the expanded bead, as determined under condition 1 shown below in accordance with the heat flux differential scanning calorimetry referenced in JIS K7122(1987), meet the following formula (1):

(*Brc*:endo)>(*Brs*:endo)≥0     (1), wherein according to condition 1, a surface potion of the expanded bead, including an exterior surface thereof, is cut out and collected to obtain a first measurement specimen, such that the entire exterior surface thereof is removed and the first measurement specimen has a weight of 1/6 to 1/4 the weight of the expanded bead before being cut; and wherein an entire surface portion of the expanded bead is cut away to leave a second measurement specimen, such that the second measurement specimen has a weight of 1/5 to 1/3 the weight of the expanded bead before being cut; and wherein a calorific value (Brs:endo) and a calorific value (Brc:endo) are each determined from multiple DSC curves obtained by first subjecting each of the second measurement specimen obtained from the surface region of the expanded bead and the first measurement specimen obtained from the center region of the expanded bead, to a heat treatment in such a manner that 1 to 4 mg of each of them is heated, for melting, to a temperature higher by 30° C. than a third fusion peak ending temperature, then maintained at that temperature for 10 minutes, then cooled to 110° C. at a second cooling speed of 2° C./min, then maintained at that temperature for 120 min, and then cooled to 40° C. at the second cooling speed of 2° C./min, each of the thus heat treated specimens being subsequently heated again, for melting, to a temperature higher by 30° C. than a fourth fusion peak ending temperature at a second heating speed of 2° C./min to obtain the multiple DSC curves in accordance with the heat flux differential scanning calorimetry referenced in JIS K7122(1987).

4. The polylactic acid resin expanded bead according to claim 3, wherein an endothermic calorific value (Bfc:endo) [J/g] and an exothermic calorific value (Bfc:exo) [J/g] of the center region of the expanded bead, which values are determined in accordance with the heat flux differential scanning calorimetry referenced in JIS K7122(1987) under condition 2 shown below, meet the following formula (2):

$$40 > [(Bfc\text{:endo}) - (Bfc\text{:exo})] > 10 \quad (2),$$

wherein according to condition 2, the endothermic calorific value (Bfc:endo) and the exothermic calorific value (Bfc:exo) are determined from a resulting DSC curve obtained by heating, for melting, 1 to 4 mg of a third measurement specimen, which is sampled in the same manner as that described in the condition 1 for the preparation of a sample for measuring the endothermic calorific value of the center region of the expanded bead, from 23° C. to a temperature higher by 30° C. than a fifth fusion peak ending temperature at the second heating speed of 2° C./min in accordance with the heat flux differential scanning calorimetry referenced in JIS K7122(1987).

5. The polylactic acid resin expanded bead according to claim 1, wherein the polylactic acid resin expanded bead has an apparent density of 25 to 400 g/L.

6. The polylactic acid resin expanded bead according to claim 1, wherein the polylactic acid resin expanded bead has an average cell diameter of 30 to 500 μm.

7. A polylactic acid resin expanded beads molded article obtainable by molding the polylactic acid resin expanded beads according to claim 1 in a mold cavity, said molded article having a bulk density of 15 to 300 g/L.

8. A polylactic acid resin expanded bead, comprising:
a crystal structure configured in a way so that the crystal structure gives a first time DSC curve when the expanded bead is heated, for melting, according to a heat flux differential scanning calorimetry, to a temperature higher by 30° C. than a fusion peak ending temperature, and a second time DSC curve when the expanded bead is then maintained for 10 minutes at the temperature higher by 30° C. than the fusion peak ending temperature, then cooled to 40° C. and then again heated, for melting, to a temperature higher by 30° C. than a second fusion peak ending temperature,
said second time DSC curve having a fusion peak having a reference peak temperature,
said first time DSC curve having a first at least one fusion peak with a peak temperature higher than the reference peak temperature and a second at least one fusion peak with a peak temperature lower than or equal to the reference peak temperature.

* * * * *